United States Patent
Vlazny et al.

(10) Patent No.: US 7,749,078 B2
(45) Date of Patent: Jul. 6, 2010

(54) SYSTEMS AND METHODS FOR ACCESSING, MANIPULATING AND USING FUNDS ASSOCIATED WITH PARI-MUTUEL WAGERING

(75) Inventors: Kenneth A. Vlazny, York, PA (US);
Brendan Burgess, Poway, CA (US);
Victor I. Harrison, Glen Rock, PA (US)

(73) Assignee: United Tote Company, Glen Rock, PA (US)

( * ) Notice: Subject to any disclaimer, the term of this patent is extended or adjusted under 35 U.S.C. 154(b) by 1427 days.

(21) Appl. No.: 11/083,792

(22) Filed: Mar. 17, 2005

(65) Prior Publication Data

US 2005/0227760 A1 Oct. 13, 2005

Related U.S. Application Data

(63) Continuation-in-part of application No. 10/731,701, filed on Dec. 8, 2003.

(51) Int. Cl.
*G06F 17/00* (2006.01)
(52) U.S. Cl. .................................................. 463/28
(58) Field of Classification Search ............. 463/25–28, 463/12, 13, 16, 30, 40–42
See application file for complete search history.

(56) References Cited

U.S. PATENT DOCUMENTS

| 3,909,002 | A | 9/1975 | Levy |
| 4,322,612 | A | 3/1982 | Lange |
| 4,669,730 | A | 6/1987 | Small |
| 4,815,741 | A | 3/1989 | Small |
| 5,038,022 | A | 8/1991 | Lucero |
| 5,265,874 | A | 11/1993 | Dickinson et al. |
| 5,321,241 | A | 6/1994 | Craine |
| 5,324,035 | A | 6/1994 | Morris et al. |
| 5,457,306 | A | 10/1995 | Lucero |

(Continued)

FOREIGN PATENT DOCUMENTS

WO WO 00/67215 11/2000

(Continued)

OTHER PUBLICATIONS

International Search Report dated Aug. 2, 2007, for International Application No. PCT/US06/08239 (2 pages).

(Continued)

*Primary Examiner*—Ronald Laneau
(74) *Attorney, Agent, or Firm*—TraskBritt

(57) ABSTRACT

Systems and methods of pari-mutuel wagering are disclosed. One method utilizes a credit instrument associated with an account set up by a patron at a pari-mutuel gaming establishment, such as a horse or dog racing track. The credit instrument may be used to place wagers at a gaming terminal and, additionally, for the purchase of goods and/or services, accessing additional informational displays, or accessing secure special areas at the pari-mutuel gaming establishment. The credit instrument acts a cash substitute wherein the patron's account may be automatically updated with all of the patron's wins, losses, and purchases via a network system or updated on the credit instrument. In other methods, pari-mutuel wagers are placed with an anonymous account such that an identity of a player is not known to the pari-mutuel gaming establishment.

23 Claims, 10 Drawing Sheets

U.S. PATENT DOCUMENTS

| | | | |
|---|---|---|---|
| 5,476,259 | A | 12/1995 | Weingardt |
| 5,557,086 | A | 9/1996 | Schulze et al. |
| 5,559,312 | A | 9/1996 | Lucero |
| 5,770,533 | A | 6/1998 | Franchi |
| 5,779,547 | A | 7/1998 | SoRelle et al. |
| 5,800,268 | A | 9/1998 | Molnick |
| 5,806,045 | A | 9/1998 | Biorge et al. |
| 5,811,772 | A | 9/1998 | Lucero |
| 5,830,068 | A | 11/1998 | Brenner et al. |
| 5,839,956 | A | 11/1998 | Takemoto |
| 5,902,983 | A | 5/1999 | Crevelt et al. |
| 5,952,640 | A | 9/1999 | Lucero |
| 5,959,277 | A | 9/1999 | Lucero |
| 5,984,779 | A | 11/1999 | Bridgeman et al. |
| 6,190,256 | B1 | 2/2001 | Walker et al. |
| 6,307,956 | B1 | 10/2001 | Black |
| 6,331,148 | B1 | 12/2001 | Krause et al. |
| 6,347,738 | B1 | 2/2002 | Crevelt et al. |
| 6,379,248 | B1 | 4/2002 | Jorasch et al. |
| 6,383,074 | B1 | 5/2002 | Boggs |
| 6,390,917 | B1 | 5/2002 | Walker et al. |
| 6,394,907 | B1 | 5/2002 | Rowe |
| 6,450,887 | B1 | 9/2002 | Mir et al. |
| 6,508,710 | B1 | 1/2003 | Paravia et al. |
| 6,511,377 | B1 | 1/2003 | Weiss |
| 6,547,131 | B1 | 4/2003 | Foodman et al. |
| 6,558,255 | B2 | 5/2003 | Walker et al. |
| 6,607,441 | B1 | 8/2003 | Acres |
| 6,634,946 | B1 | 10/2003 | Bridgeman et al. |
| 6,652,380 | B1 | 11/2003 | Luciano |
| 6,722,980 | B2 | 4/2004 | Stronach |
| 6,811,488 | B2 * | 11/2004 | Paravia et al. ............ 463/42 |
| 6,830,514 | B2 | 12/2004 | Meyer et al. |
| 2001/0051540 | A1 | 12/2001 | Hindman et al. |
| 2002/0028708 | A1 | 3/2002 | Busch et al. |
| 2002/0065566 | A1 | 5/2002 | Aronson et al. |
| 2002/0094858 | A1 | 7/2002 | Yacenda |
| 2002/0098883 | A1 | 7/2002 | Packes, Jr. et al. |
| 2002/0111213 | A1 * | 8/2002 | McEntee et al. ............ 463/42 |
| 2002/0177483 | A1 | 11/2002 | Cannon |
| 2003/0036425 | A1 | 2/2003 | Kaminkow et al. |
| 2003/0078094 | A1 | 4/2003 | Gatto et al. |
| 2003/0092478 | A1 | 5/2003 | Weil |
| 2003/0228907 | A1 | 12/2003 | Gatto et al. |
| 2003/0228910 | A1 | 12/2003 | Jawaharial et al. |
| 2004/0014514 | A1 | 1/2004 | Yacenda |
| 2004/0029630 | A1 | 2/2004 | Walker et al. |
| 2004/0036212 | A1 | 2/2004 | Walker et al. |
| 2004/0082384 | A1 | 4/2004 | Walker et al. |
| 2004/0087360 | A1 | 5/2004 | Chamberlain et al. |
| 2004/0229671 | A1 | 11/2004 | Stronach et al. |
| 2008/0085763 | A1 * | 4/2008 | Randhawa ............ 463/25 |
| 2008/0102957 | A1 * | 5/2008 | Burman et al. ............ 463/42 |
| 2008/0153583 | A1 * | 6/2008 | Huntley et al. ............ 463/25 |
| 2009/0042631 | A1 * | 2/2009 | Randhawa ............ 463/17 |
| 2009/0090923 | A1 * | 4/2009 | Murayama ............ 257/97 |
| 2009/0093292 | A1 * | 4/2009 | Randhawa ............ 463/17 |
| 2009/0280886 | A1 * | 11/2009 | Randhawa ............ 463/17 |

FOREIGN PATENT DOCUMENTS

| | | |
|---|---|---|
| WO | WO 02/38233 A1 | 5/2002 |
| WO | WO 03/073386 A2 | 9/2003 |
| WO | WO 03/090139 A1 | 10/2003 |
| WO | 03/104972 A1 | 12/2003 |
| WO | 2004/092993 A1 | 10/2004 |

OTHER PUBLICATIONS

International Search Report for International Application No. PCT/US06/34550 mailed Jul. 21, 2008.

The Starbucks Card Duetto™ Visa®, (visited Dec. 2, 2003) <http://www.stabucks.com/card/duetto.asp?cookie%5Ftest=1>, 1 page.

Nyra One Account℠ Membership Kit, <www.nyra.com>, 17 pages, Printed in Jun. 2004.

Colorado Lottery (visited Sep. 9, 2004) <https://www.coloradolottery.com/mylottery/login.cfm>.

Players' Choice Club Racing Membership Application (visited Jan. 18, 2005) <http://www.pennbet.com>.

Account Wagering Services, Penn National Gaming, Inc. (visited Jan. 18, 2005) <http://www.pennbet.com/terms_conditions.html>.

* cited by examiner

SYSTEMS AND METHODS FOR ACCESSING, MANIPULATING AND USING FUNDS ASSOCIATED WITH PARI-MUTUEL WAGERING

CROSS-REFERENCE TO RELATED APPLICATIONS

This application is a continuation-in-part of pending U.S. patent application Ser. No. 10/731,701, filed Dec. 8, 2003, the disclosure of which is incorporated in its entirety herein by this reference.

This application is also related to co-pending U.S. patent application Ser. No. 11/223,217, filed Sep. 9, 2005, which is also a continuation-in-part of pending U.S. patent application Ser. No. 10/731,701, filed Dec. 8, 2003.

BACKGROUND OF THE INVENTION

1. Field of the Invention

The present invention relates to systems and methods for accessing, manipulating and using funds associated with placing a pari-mutuel wager. More specifically, the present invention relates to systems and methods of accessing funds using a credit instrument in order to place a pari-mutuel wager and use of such funds for the purchase of goods, services or both at the pari-mutuel wagering establishment.

2. State of the Art

Pari-mutuel wagering is considered one of the fairest systems of betting. The general concept of pari-mutuel wagering is a betting system in which winners share the total stakes wagered on an event, minus a percentage for the management or "house." Stated another way, pari-mutuel wagering is a form of betting in which the losers' wagers (less a percentage for the house and taxes) are distributed among the winners.

A representative example of pari-mutuel wagering occurs in horse or dog race betting in which those who bet on the winning horses or dogs share the total stakes wagered minus a percentage set aside for the management and an amount needed to fund the purses in the race. There may be other portions of the total stakes set aside such as for taxes or other fees. In the typical horse race pari-mutuel wagering system, the finishing order of the horses (e.g., the win horse, the place horse, and the show horse) creates winning events for the bettor. However, pari-mutuel wagering need not be limited to horse or dog racing. The pari-mutuel wagering environment can be used for virtually any type of event. For example, pari-mutuel wagering may be used for sporting events such as jai alai, baseball, basketball, football, soccer, etc.

Pari-mutuel wagering relies to a significant degree on the skill of the bettor. For instance, in a horse or dog race, the bettor uses the racing history of the horses or dogs plus their knowledge regarding the specific type of race, length of the race, track conditions, or other conditions to determine his or her wagering decision such as which horse will win, place, or show. Similarly, in choosing the outcome of a sporting event such as a basketball tournament, the bettor uses his or her knowledge of each of the teams, how each team will match up against another, and many other factors in determining his or her wager.

In a conventional pari-mutuel wagering environment, wagering funds are stored in either wagering accounts, which have a bettor's name and/or other identifying information associated with the wagering account, or wagering vouchers, which must be presented at the pari-mutuel facility to effect a wagering transaction. An example of the conventional pari-mutuel wagering environment can be found in U.S. Pat. No. 4,322,612 to Lange. Patrons purchase cash vouchers at teller windows or, alternatively, from terminals that accept and validate currency and issue cash vouchers. For example, a bettor typically inserts a cash voucher into a betting machine and places his or her wagers. Upon completion of the wager entry, the betting machine issues wager tickets to the bettor that reflect the wagers made and a new cash voucher that reflects the balance of credit remaining. If the bettor elects to cease wagering before all remaining credits are exhausted, the bettor may have the cash voucher converted to cash at teller terminals or may mail the voucher to the betting establishment for reimbursement. Cash vouchers afford bettors certain conveniences by reducing or eliminating the need to stand in long lines at betting windows. However, other aspects of cash vouchers are inconvenient. For example, bettors are required to keep track of multiple vouchers as wagers are placed throughout the wagering session. Furthermore, vouchers are not particularly durable since they are made from paper. Finally, cash vouchers and the wagers produced therefrom are discrete and independent from each other (i.e., bettors must track and redeem both for full reimbursement). However, the use of cash and cash vouchers may be problematic in that if a player loses their cash or cash voucher, the cash or cash voucher can be used by someone else. Also, the pari-mutuel gaming establishment is not able to track betting patterns of pari-mutuel wagers made with cash or cash vouchers.

Like cash vouchers, wagering accounts enable bettors to establish a credit balance from which they can make wagers. Typically, a patron purchases (or opens) a wagering account at a designated staffed area within the pari-mutuel racing facility. For instance, with the Penn National PLAYERS' CHOICE club card, players are required to provide a photo identification and fill out an application in order to receive the PLAYERS' CHOICE club card. Accounts can be opened in a variety of denominations, but many tracks require a minimum deposit of $25 to $100. In conventional pari-mutuel wagering activities, a patron can only open a wagering account by providing his or her name and, optionally, other identifying information such as a social security number, for association with the account. The patron receives a receipt or a house card that contains a unique account number and a personal identification number (PIN). Subsequently, the patron may place wagers by inputting this information into specially designated wagering terminals or by swiping the house card in a card reader. The cost of each wager is automatically deducted from the account balance. When the wagering is completed, the specially designated wagering terminal may issue a receipt (not a redeemable ticket) as a confirmation of the wagers placed. Wagers are electronically stored in the host computer, and prizes for winning wagers are automatically credited to the individual's wagering account. To retrieve funds from the wagering account, a patron can go to a teller at a betting establishment or an off-site betting site and transfer money to his or her bank account, or request a check through the mail. By automatically crediting patrons' winnings, account wagering is more dynamic than the cash voucher system. Like the cash voucher system, account wagering can reduce or eliminate the need to stand in long lines at betting windows by further lowering the cost of wagering equipment. Furthermore, account wagering reduces the number of tickets and vouchers that a patron must track. However, account wagering also presents inconveniences in that establishing a wagering account can be time consuming and confusing and as with cash vouchers, account wagering is used solely for the purchase of pari-mutuel wagers on-site and off-site of the betting establishment thereby limiting their use for purposes other than wagering. Additionally, account wagering does not allow for anonymity of wagering, a trait that is preferred by many patrons who seek confidentiality in their wagering transactions.

Penn National offers a ticketless wagering account called a "day account" wherein a patron may get a voucher associated with a portable terminal such as a TINY TIM terminal. The patron is able to establish the day account by going to a teller and setting up the day account, wherein pari-mutuel wagers are placed with the TINY TIM terminal.

The New York Racing Association (NYRA) also offers a ticketless wagering account called a NYRA One Account. A bar coded account card is provided that enables placing pari-mutuel wagers using a so-called "SAM machine" located at a race track. A patron places a bet by inserting his or her account card in a designated slot in a SAM machine located at the race track. The patron keys in his or her PIN. A screen is displayed showing the account balance. The patron touches the caption display "Acct. Wager" and reinserts the account wagering card. The patron then places his or her wager using the interface on the SAM machine. The display screen reflects the deductions as the patron makes each bet. The patron's account associated with the account card will be credited or debited immediately after the race on which the patron wagered is made official. However, the funds associated with the NYRA One Account Card may only be used for wagering purposes and as with conventional wagering accounts, do not allow for anonymity in wagering.

Numerous cashless gaming systems exist in the prior art. For instance, U.S. Pat. No. 5,984,779 to Bridgeman et al., the disclosure of which patent is incorporated by reference herein, discloses a gaming method for table games (e.g., blackjack, pai-gow, etc.) and real time electronic gaming (slots, draw poker, keno, bingo) where payment may be accepted using a cashless system such as coupons, credit cards, or debit cards. U.S. Pat. No. 5,265,874 to Dickinson et al. discloses a cashless gaming apparatus and method, the disclosure of which is incorporated by reference herein.

Another cashless gaming system is disclosed in U.S. Pat. Nos. 6,347,738 and 5,902,983 to Crevelt et al., the disclosures of each of which are incorporated by reference herein. The patents by Crevelt et al. disclose a gaming machine that includes an apparatus necessary to send requests to, and receive authorizations from, an electronic funds transfer (EFT) system or a financial network. All such requests for credit are limited to a preset amount, so that when a player uses an EFT transfer to obtain playing credit, that credit will be limited to no more than a specified amount. In practice, the player inserts his or her credit card, ATM card (debit card), or pari-mutuel gaming venue issued debit card, plus some other means for verifying a player's identity if desired, requests playing credit, and receives the preset amount of credit which can be converted to plays on the gaming machine. If the player wins, the gaming machine may be used to transfer a payout to the player's account. While cashless gaming machines increase the ease and convenience to the player, Crevelt et al. only discloses gaming environments such as a traditional slot game, a progressive slot game, video poker games, a keno game, a blackjack game, a multiline game, or a lottery game. Further, the pari-mutuel gaming venue issued debit cards are only used for wagering purposes and are not anonymous.

However, the use of credit cards, debit cards or pari-mutuel gaming venue issued debit cards is cumbersome because the player's account balance is stored on the financial network. Further, each time the player desires to use the credit card, debit card or pari-mutuel gaming venue issued debit card, the totalisator system must communicate with the financial network to validate that funds are available and remove the finds from the account balance associated with the credit card, debit card or pari-mutuel gaming venue issued debit card. Another disadvantage of the betting cards conventionally used in pari-mutuel wagering is that the pari-mutuel wagering transactions are linked to the player's name and, thus, the player's wagering activities may be tracked. Many players do not open such wagering accounts because they do not want their wagering activities to be known by third parties due to privacy concerns.

Since the account balance is stored on the financial network, a highly reliable and fast connection is required for the totalisator system to access the financial network or customer service suffers. For instance, as players typically desire to place pari-mutuel wagers at the last possible moment when odds are approaching final odds, any pari-mutuel wager transactions that are placed against the player's account balance on the financial network needs the fast connection between the financial network and a point-of-sale wagering device of the totalisator system for such pari-mutuel wagers to be placed. Any interruption or delay in communication between the financial network and the point-of-sale wagering device caused by the quality of the connection or other network traffic will cause dissatisfaction of the player and any other players waiting to place pari-mutuel wagers. Further, ensuring a high quality and reliable connection can be costly.

In addition to the problems associated with network connections, loading, un-loading and transaction charges can be prohibitive to the player. For instance, banks and other financial institutions typically charge a per transaction fee and/or a fee based on the value of the transaction each time the player accesses their account balance stored on the financial network. Thus, any fees that are charged to the player to access their balance on the financial network can be substantial and may discourage or even prevent players from making a significant number of pari-mutuel wagers.

Therefore, there exists a need in the art for a method of pari-mutuel wagering where the bettor has simultaneous access to funds via an EFT system or funds in an account associated with an instrument for pari-mutuel wagering, wherein the instrument may be used for the purchase of products and/or services on-site at the physical betting locations. Fulfilling this need creates a cashless, country club-like environment at the race track, making it easy to keep track of all expenditures (e.g., wins, losses, and purchases) for the day and facilitating greater spending by the patron on-site and, thus, increased revenue and profit for the pari-mutuel facility. A need also exists for a method of anonymous wagering, wherein a player is able to place pari-mutuel wagers anonymously, yet, still have the benefits of a cashless wagering system.

BRIEF SUMMARY OF THE INVENTION

The present invention includes methods and systems of pari-mutuel gaming at pari-mutuel gaming establishments such as, for example, horse or dog racing tracks, off-track betting (OTB) sites, sporting event locations that offer pari-mutuel wagering (i.e., jai-alai), or any other sporting event.

In one embodiment, a method of pari-mutuel wagering includes providing a gaming terminal configured for a player to place a pari-mutuel wager and providing a player an opportunity to place funds in an anonymous account. The player is allowed to access a portion of the funds of the anonymous account for use at the gaming terminal and the player is allowed to place a pari-mutuel wager at the gaming terminal on a pari-mutuel event using the portion of the funds of the anonymous account.

A method of conducting a pari-mutuel gaming activity is disclosed in an additional exemplary embodiment. The method includes providing a gaming terminal associated with a device for reading a credit instrument and providing a player an opportunity to associate an anonymous account having a monetary value with the credit instrument, wherein the credit instrument is readable by the device for reading the credit instrument. The method also includes providing the player a second opportunity to place a pari-mutuel wager on a pari-mutuel gaming activity using the credit instrument and the gaming terminal.

In another exemplary embodiment, a method of conducting a pari-mutuel gaming activity includes enabling a player to associate a credit instrument with an account of a financial institution and with an account of a pari-mutuel gaming system. The player is further enabled to transfer funds between the account of the financial institution account and the account of the pari-mutuel gaming system. Subsequent to a transfer of such finds, the player is enabled to place a pari-mutuel wager with funds associated with the account of the pari-mutuel gaming system using the credit instrument. As a consequence, only a single transaction fee may be incurred by the player, rather than incurring multiple transaction fees with the placement of each subsequent wager. In this manner, the player may be incentivized to place more bets. In addition, last minute wagers are facilitated, as funds resident in the pari-mutuel gaming system account are employed.

The present invention also includes systems to implement the above mentioned methods of pari-mutuel gaming.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1A:
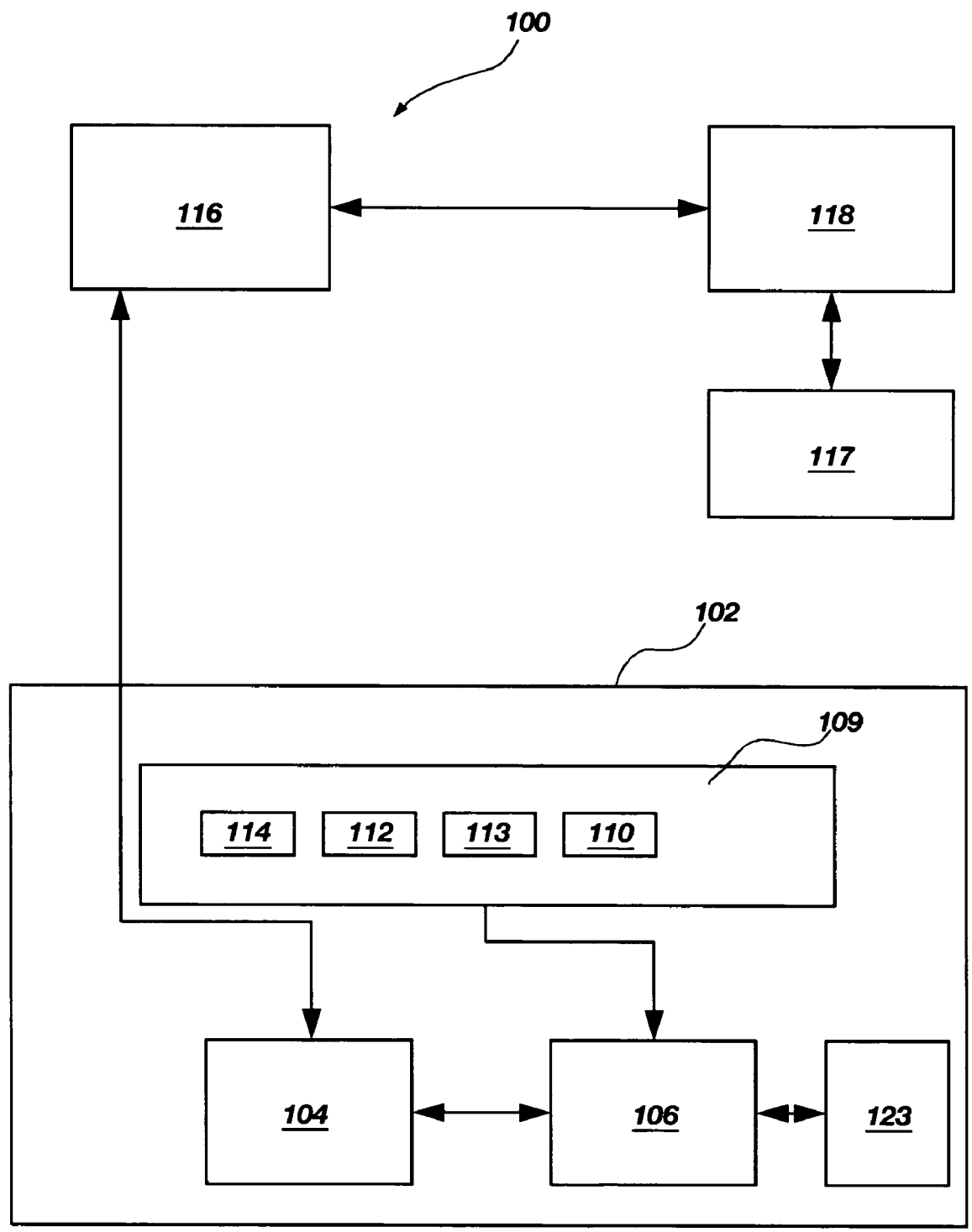
FIGS. 1A-1C are block diagrams of pari-mutuel gaming systems on which the pari-mutuel gaming methods of the present invention described in FIGS. 2A, 2B, and 3 may be implemented.

The present invention includes methods for cashless, pari-mutuel wagering at a pari-mutuel gaming venue such as, for example and without limitation, a horse or dog racing track or an off-track betting (OTB) site. In accordance with the present invention, pari-mutuel wagers may be placed anonymously using a credit instrument, an anonymous account or combinations thereof. As used herein, the term "credit instrument" may include or be associated with, without limitation, a house card, a credit card, a smart card, a debit card, a bank card, a token card of a tote system, an anonymous token card, a pari-mutuel gaming venue issued card, a voucher, a magnetic strip, a radio frequency identification transmitter, an ATM card, a smart card account, a combination house card/credit/debit card, a token/debit card, a stored value card, a bar code, any coded indicia, a pre-owned instrument (i.e., a VISA® card, a DISCOVER® card, a MASTERCARD® card, an AMERICAN EXPRESS® card, a STARBUCKS® card, a HOME DEPOT® card, an airline mileage program card, or a driver's license), a gift card, or combinations of any thereof. The token/debit card may have a pre-set amount of money that is purchased by the player such that as the player wins, more money may be placed on the token/debit card, wherein the money that is won can be transferred to another account. The "credit instrument" may also be used to refer to a device having a unique identifier including, but not limited to, a cell phone, a personal digital assistant (PDA), a virtual address associated with an individual, or any other electronic address. The present invention also includes using the credit instrument to access funds from an account associated with the credit instrument to place a pari-mutuel wager. The term "account" as used throughout this disclosure includes, but is not limited to, accounts such as credit card accounts, bank accounts associated with debit cards, personal checking accounts, and accounts set up with establishments (i.e., pari-mutuel gaming venues) that offer gaming.

In one embodiment, the patron is enabled to associate a credit instrument with an account in a totalisator system of a pari-mutuel gaming venue. The credit instrument is associated with an account of a player at the pari-mutuel gaming establishment, contains information regarding the account recorded therein, and is re-usable (i.e., the credit instrument may be used more than once and on more than one day). In various embodiments, the credit instrument may be associated with a 16-digit account number, with a 4-digit default PIN or a password, wherein the numbers may be printed on the back of or be associated with the credit instrument. The 4-digit PIN may have a film covering it that may easily be removed by scratching to reveal it. If a magnetic strip card is associated with the credit instrument, the magnetic strip may be encoded with the default PIN and when used for the first time the default PIN is automatically entered in the totalisator system. The PIN may, subsequently, be changed by the player. Thus, the credit instrument may be initially configured as a bearer instrument (i.e., a cash substitute).

A player may deposit finds into an account associated with the credit instrument at staffed or self-serve terminals located at a pari-mutuel gaming establishment using any number of vehicles, such as, for example, cash, check, debit/credit card charges, direct deposit, a transfer from an EFT system, among many others. If a pari-mutuel gaming establishment does not desire to invest in PIN pads at staffed terminals, self-serve terminals may issue vouchers for funds in the patron's account associated with the credit instrument that may be redeemed at a staffed terminal or mailed to the pari-mutuel gaming establishment for redemption. Funds from vouchers and winning tickets may be deposited into the account associated with the credit instrument at a staffed or self-serve terminal that reads the credit instruments. If the funds of the player's account associated with the credit instrument are depleted, the player may replenish them using any one of the above methods. Also, the player's wins, losses, and expenditures may be automatically updated in the player's account by the pari-mutuel gaming establishment. If the player's winnings qualify for withholding by a tax authority, such as the Internal Revenue Service (IRS), the winnings may be flagged by the pari-mutuel gaming establishment and subsequently credited to the player's account upon completion of forms required by the tax authority.

The credit instrument may be used for placing pari-mutuel wagers and, additionally, for the purchase of products and/or services at the pari-mutuel gaming establishment, for accessing additional betting screens, or special access areas (e.g., the club house). Essentially, the credit instrument operates as or may be used like a cash substitute at the pari-mutuel gaming establishment. If desired, a variety of graphics may be used on the credit instrument if the credit instrument is provided by the pari-mutuel gaming establishment to assist with marketing as desired by the management of the pari-mutuel gaming establishment.

Anonymous Pari-Mutuel Wagering

In another embodiment, the credit instrument may be associated with a so-called "anonymous" account in which the identity of the player is not known to the pari-mutuel gaming establishment. For instance, the player may be provided with an opportunity to associate a credit instrument with an anonymous account of a pari-mutuel gaming system or set up an anonymous account using a gaming terminal of a pari-mutuel gaming system. In one embodiment, the player enters an identifying feature (i.e., an account number of a credit card) or scans the identifying feature (i.e., a magnetic strip of a debit card) of the credit instrument with a device capable of reading the credit instrument that is associated with a pari-mutuel gaming system. Once the credit instrument is identified by the pari-mutuel gaming system, an anonymous account associated with the pari-mutuel gaming system is established. The anonymous account may be identified by the pari-mutuel gaming system by a code or account number, and optionally encrypted, but the identity of the player who sets up the anonymous account is not readily available to the pari-mutuel gaming system, thus, keeping the player anonymous. Once the anonymous account is established and the player has placed finds in the anonymous account, the player may place pari-mutuel wagers using the funds of the anonymous account. The funds of the anonymous account may also be used to purchase goods and/or services at the pari-mutuel gaming establishment. For security purposes, the player may also associate a password or a PIN number with the credit instrument such that in order to access finds of the anonymous account, the password or the PIN number must be entered to activate the anonymous account.

In another embodiment, the player may set up an anonymous account with a pari-mutuel gaming system without a credit instrument. For instance, the player may enter a unique identifier such as, for example, a username into a gaming terminal of a pari-mutuel gaming system, wherein the pari-mutuel gaming system associates and identifies the anonymous account with the unique identifier. In another embodiment, the unique identifier may be established with a biometric device such as, for example, a fingerprint scanner. In this manner, the player may deposit funds in the anonymous account, place pari-mutuel wagers and access the funds for the other purposes (i.e., purchasing goods or services) even if the player does not have a credit instrument.

The use of an anonymous account and the ability to place pari-mutuel wagers appeals to players who are more likely to place pari-mutuel wagers if their gaming activities are anonymous. For instance, certain patrons may desire to keep their wagers confidential for cultural or religious reasons. Thus, an anonymous account associated with a credit instrument may be established by a player, wherein the anonymous account may be associated with a credit instrument. With the anonymous account, the player is not required to provide identifying information such as a social security number or name, and is not required to fill out an application. In one embodiment, the anonymous account may be set up at a self-service terminal and associated with the credit instrument, wherein the anonymous account may be accessed with the credit instrument and funds associated with the anonymous account may be used as cash. In this manner, the player is able to quickly set up the anonymous account and does not need to go to a special location at the pari-mutuel venue to fill out a lengthy application to obtain the credit instrument.

The association of the anonymous account with the credit instrument has many security advantages over the use of cash or vouchers in that the credit instrument may be protected with a security measure such as, for example, a PIN (personal identification number), any other access code, a password, or use of a biometric identifier. For instance, if the credit instrument is lost, someone who does not know the PIN, access code, or password would not be able to access the funds in the anonymous account associated with the credit instrument unlike cash or a voucher which, if lost, may be used by anyone that finds the cash or the voucher. Further, the anonymous account may be used to deter money laundering in that, under federal mandates to help combat terrorism funding, an amount of money that people put into and take out of the anonymous account may be limited.

Other advantages of the anonymous account are in marketing or wager tracking. For instance, customer relationship management (CRM) software of a tote system implementing the anonymous account, unlike the use of cash or vouchers, may be configured to track wagering activities associated with the anonymous account. In this manner, the CRM may follow and track bet patterns, betting trends and betting tendencies which can be used to develop marketing information or programs. Other advantages of the anonymous account include paperless aspects of the credit instrument such as the generation of less trash, requiring less labor to set up accounts at the pari-mutuel gaming venue, and various machines used in the tote system (i.e., terminals that handle vouchers) may last longer if they do not have to print vouchers. Further, the pari-mutuel gaming establishment may decide not to replace lost, stolen, destroyed, or altered credit instruments, along with any funds from a credit instrument that is used without the owner's permission.

The amount of money associated with the credit instrument issued to the player may be in a pre-denominated amount such as, for example, $20, $30, $40, or $50, etc. Pari-mutuel gaming establishments may also market the credit instrument in the form of a gift certificate or a gift card to attract customers. In one embodiment, the credit instrument may act as a cash substitute, wherein a person must have the physical credit instrument in order to redeem any cash balance. Further, the credit instrument is re-usable and may be used from one day to a subsequent day. If the patron is a member of a "rewards" program at the pari-mutuel gaming establishment, the credit instrument may be associated with the rewards program such that each wager placed using the credit instrument will accrue points or another value with the rewards program. The rewards points may be used for a variety of different purposes such as, for example, credit for wagering and non-wagering purposes, access to special access areas, etc.

The anonymous account associated with the credit instrument may be upgraded by the patron, wherein the credit instrument is converted to an "account card" by the patron giving the pari-mutuel gaming establishment his or her name and address at a staffed or self-serve terminal, or the credit instrument may be issued initially to the patron as an account card. If the anonymous account associated with the credit instrument is upgraded, the patron may continue to use the same credit instrument as an account card or the pari-mutuel gaming establishment may issue another card. In this embodiment, the account house card may be automatically configured to record rewards points for each wager placed using funds associated with the account card. Additionally, funds may be transferred between the account associated with the patron's account card and his or her bank account by direct deposit. The account house card may give the owner an additional level of security because their identity is known. Thus, the account associated with the account house card may be promptly frozen by the pari-mutuel gaming establishment if the house card is lost or stolen.

In another embodiment, the credit instrument may also be a so-called "super card," which comprises a combination stored value card and debit/credit card. In other words, the super card may be used as both a debit/credit card and a house card with an associated account set-up with a pari-mutuel gaming establishment. In one particular aspect of the super card useful for marketing at the pari-mutuel gaming establishments, when the debit/credit card function of the super card is used for a purchase, a portion of the purchase price may be credited toward the account set up with the pari-mutuel gaming establishment. For example, if a patron uses the super card as a debit or credit card to purchase groceries, a predetermined percentage of the price of the groceries may be credited toward the account associated with the pari-mutuel gaming establishment (i.e., the house card portion) of the super card. The house card portion of the super card may be set up so that it may only be able to be used at the pari-mutuel gaming establishment for specific uses, such as pari-mutuel wagering. Funds from the different portions of the super card (i.e., the debit or credit card portion and the house card portion) may be transferred to and from each other. In another embodiment, an account associated with the credit instrument may also accrue points for wagering, wherein the points may be converted to a cash balance and transferred to other portions or accounts associated with the credit instrument.

When the player is finished gambling, any balance on the credit instrument may be transferred to the player's bank account, cashed-out, or the balance may remain in the account associated with the credit instrument. The player may cash-out a balance on the credit instrument at any staffed or self-serve terminal at the pari-mutuel gaming establishment. The player may also have a cash voucher issued by a self-serve terminal at the pari-mutuel gaming establishment that can be redeemed at a later time either by mail or at a staffed terminal. If a balance is kept in the account associated with the credit instrument, administrative fees may be deducted by the pari-mutuel gaming establishment from the remaining balance after a predetermined time period of non-use (e.g., 12 months).

Intra-Operability of the Credit Instrument with a Financial Network

Players and pari-mutuel gaming establishments both desire the use of a single credit instrument for making pari-mutuel wagering and non-wagering purchases (i.e., to purchase goods or services. Thus, in yet an additional exemplary embodiment, a credit instrument is associated with multiple accounts with discrete balances. In one exemplary embodiment, the credit instrument is associated with an account or a balance of a player at a financial institution through a financial network (e.g., a bank or a credit card company) and an account or balance of the player associated with a closed loop system such as, for example, a pari-mutuel gaming system (e.g., a totalisator system of a pari-mutuel gaming entity). The financial network balance may be, for example, a credit limit of a credit card or an amount of money in an account associated with a debit card. The balance associated with the closed loop system may be, for example, an amount of money credited to or transferred from another account such as, for example, the account associated with the financial network balance and in another embodiment, the balance associated with the closed loop system may be an anonymous account as described herein. In the exemplary embodiment, the closed loop system is a totalisator system 602 indicated with dashed lines in FIG. 7. In yet other embodiments, the credit instrument may be associated with other or additional accounts or balances.

Figure 7:
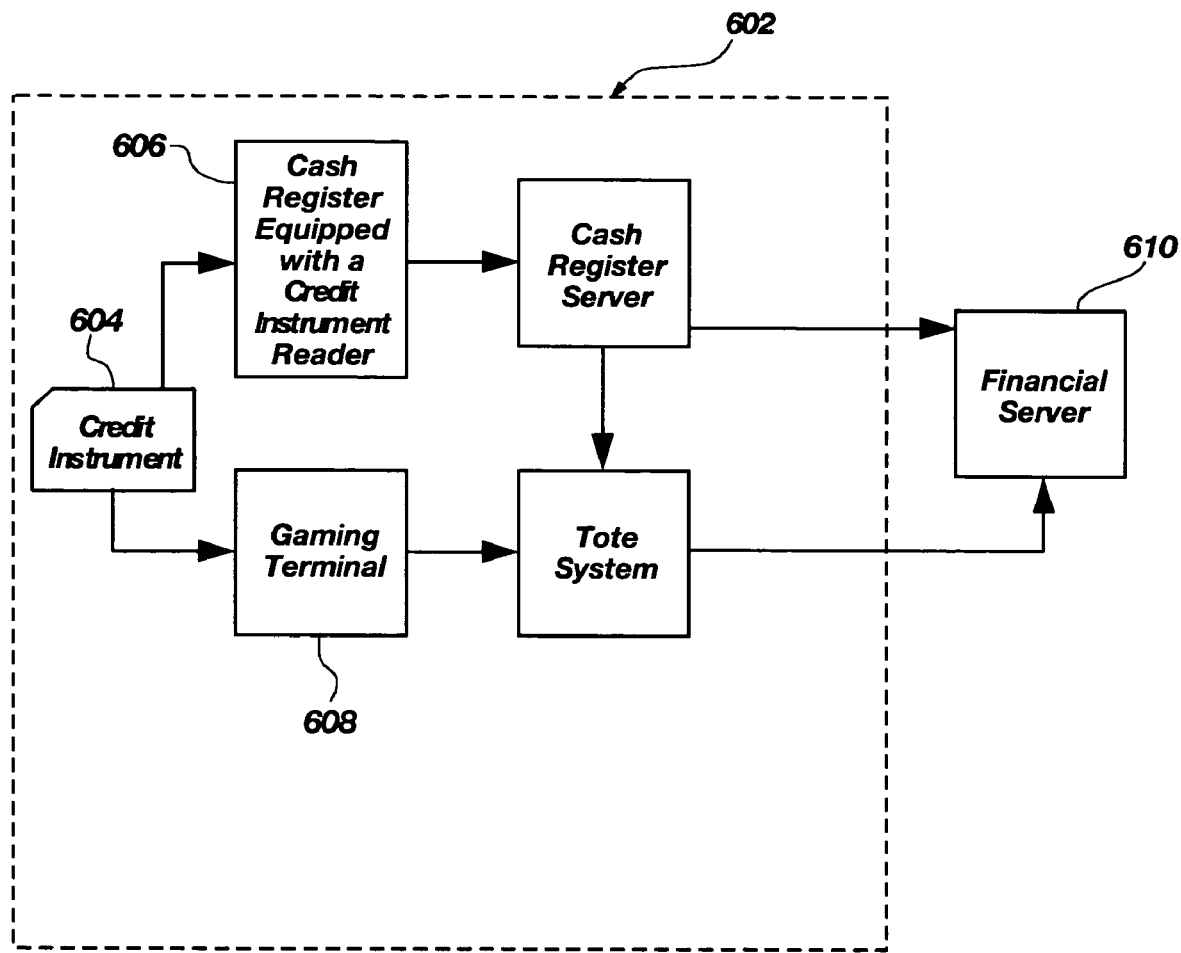
FIG. 7 is another example of the ability to use a credit instrument on-site from a pari-mutuel gaming establishment.

With credit instrument 604 of FIG. 7, a player is enabled to utilize an input device of the totalisator system 602 such as, for example, a cash register 606 or a gaming terminal 608 associated with the totalisator system 602 in order to transfer funds between a first account accessible by the player and associated with the financial network balance and a second account accessible by the player and associated with the balance of the totalisator system 602. For example, at the beginning of a day, a player at a pari-mutuel gaming venue may have a $100 balance (such as a debit card balance) on the first account associated with the financial network and a $0 balance of the second account associated with the totalisator system 602. The player may use the input device associated with the totalisator system 602 to transfer funds from the first account balance associated with the financial network to the second account balance associated with the closed loop system. In this manner, the player is enabled to transfer $50 from the first account associated with the financial network balance to the second account associated with the closed loop system such that the player may access the transferred-in $50 augmenting the balance of the second "account" associated with the closed loop system to purchase or place one or more pari-mutuel wagers at the pari-mutuel gaming venue without incurring multiple fund transfer charges. The other, remaining $50 balance of the first account associated with the financial network may be used to purchase other goods or services at the pari-mutuel gaming venue such as, for example, food from concessions with a point-of-sale terminal networked to the financial server 610. In other embodiments, the player may access and transfer funds between the multiple accounts associated with the credit instrument remotely such as, for example, with a telephone-based system or via the Internet.

By using the credit instrument 604 associated with multiple accounts and their associated balances, the player is enabled to place pari-mutuel wagers and purchase other goods or services, such as concessions, with a single credit instrument. The credit instrument 604 is also re-usable in that the credit instrument 604 may be used more than once and on more than one day. Further, the player is enabled to avoid any financial network charges that may be incurred per transaction (i.e., each time a person accesses their balance on a financial network, the financial institution may charge a service fee) and dollar-based costs by conducting a "bulk" transfer of funds from the financial network to the closed loop totalisator system 602 and vice versa. Further, the use of multiple balances associated with the credit instrument 604 enables the player to place last minute or last second pari-mutuel wagers without having to connect to the financial server 610, since the funds to be employed already reside in the player's account in the closed-loop totalisator system 602 of the pari-mutuel gaming venue. Thus, the pari-mutuel wager, and particularly a last-minute wager, is more likely to be incentivized and made since the potential for a failure in making and holding a connection between the closed loop totalisator system 602 and the financial server 610 while a wager is being attempted is eliminated, thus, increasing player satisfaction.

In yet another embodiment, the credit instrument may be associated with a marketing program to provide incentives for a player having the credit instrument to use the credit instrument and earn credit for placing pari-mutuel wagers. For instance, if the credit instrument is a credit card or a debit card, the account associated with the credit instrument may be set up such that deposits are made to the second account associated with the closed loop system upon use of the credit instrument to make purchases with the first account associated with the financial network. In this manner, each time the player uses the credit instrument to make a purchase, a specified amount of funds (such as, for example, a percentage of the value of the purchase) is automatically deposited or credited into the second "account" associated with the balance of the closed loop system. For example, a player's DISCOVER® credit card may be set up such that upon making a purchase with the DISCOVER® credit card, a deposit or credit is made to the balance of the second account associated with the closed loop system based on the level or amount of purchases for which the DISCOVER® credit card is used. In this manner, as the player uses the credit instrument to purchase concessions, goods or services at the pari-mutuel gaming venue, the player may earn credit or funds for pari-mutuel wagering. Further, in order to provide additional incentives for the player to use the credit instrument associated with the multiple accounts, the player may receive extra or bonus credit for using the credit instrument to make specific purchases such as, for example, by spending money from the first account at the pari-mutuel gaming establishment. In another embodiment, the second account and associated balance of the closed loop system may be an account specific to a particular pari-mutuel gaming venue (e.g., Belmont Park) or associated with a particular totalisator company (e.g., United Tote).

In another embodiment, a credit instrument may be used on-site at a pari-mutuel gaming establishment such as a horse track to access funds. The credit instrument may be used at a gaming terminal or, by way of example, at a cash register configured to read the credit instrument. The player's account information and balance may be accessed from the tote system if the information is contained thereon or from an off-site financial server or similar device. The credit instrument may also be used off-site at a cash register configured to read the credit instrument, an off-site ATM, or an off-site gaming terminal. The account associated with the credit instrument may also be used to place wagers and buy goods and/or services over the Internet or phone.

Pari-Mutuel Gaming System

Referring to FIG. 1A, a pari-mutuel gaming system 100 is illustrated in the form of a block diagram, in which the pari-mutuel gaming methods of the present invention described herein may be implemented. The pari-mutuel gaming system 100 may include a pari-mutuel gaming terminal 102 that includes a player interface 109, microprocessor 106 including associated memory and software, network interface apparatus 104 with associated software, and a printer 123 if desired. The pari-mutuel gaming terminal 102 may have a housing (not shown) that supports the player interface 109 including a device for reading the credit instrument 114 (optionally used in conjunction with secondary identifier input device 113), a player input device 110, and a display 112. In one embodiment, the device for reading the credit instrument is a card reader when the credit instrument is a card. In other embodiments, the device for reading the credit instrument is any device capable of recognizing a unique identifier associated with the credit instrument or if an anonymous account is set up without a credit instrument, the device comprises an input device such that the player may enter a user name or a biometrics scanner. A secondary identifier input device 113 may be integrated, if desired, with the device for reading the credit instrument 114. The microprocessor 106 and its associated memory and software are in electrical communication and operably coupled with a network interface apparatus 104. The network interface apparatus 104 is operably coupled to the pari-mutuel gaming establishment computer system 116, which may include a database of player accounts, via a phone line, cable line, or other suitable, secure connection. The pari-mutuel gaming establishment computer system 116, located at the pari-mutuel gaming establishment, may be a computer system such as the Tote System sold by United Tote. Such a computer system may be configured to calculate odds, pool bets from multiple pari-mutuel gaming terminals 102, and store the player's account information and balance.

The player interface 109 is in electrical communication and operably coupled to a microprocessor 106 and provides the mechanisms necessary for a player to initiate a funds transfer to and from the player's account on the pari-mutuel gaming establishment computer system 116. The device for reading the credit instrument 114 of the player interface 109 is configured for reading encoded information on a credit instrument. The credit instrument may be optionally used with a unique secondary identifier input device 113 such as, for example, a smart card with embedded microchips, an array of buttons for entry of a personal identification number (PIN) or other code, a key, a finger print imaging device, a retinal scan, or other biometrics device for added security measures to help verify a player's identity and account. By utilizing the device for reading the credit instrument 114, the pari-mutuel gaming establishment may dispense with the use of paper ticket readers. Compared to conventional paper ticket readers currently used at most pari-mutuel gaming establishments, a device for reading the credit instrument 114 is less expensive and more reliable. Conventional paper ticket readers often have problems reading damaged paper tickets creating patron frustration, long lines at the pari-mutuel gaming establishment, and inaccurate ticket rejections. Furthermore, the credit instrument, which may be made from a material such as plastic, is much more durable than conventional paper tickets which are easily damaged by moisture and handling.

The display 112 may comprise a display such as a liquid crystal display (LCD), an LCD touch screen, a plasma display, a field emission display (FED), or employ any other suitable display technology known to those of ordinary skill in the art. The display 112, under control of a microprocessor 106, displays information pertinent to the transfer of finds from the player's account with the pari-mutuel gaming establishment. Such information may include, for example, a prompt to enter a personal identification number, a notice that the transfer of funds was authorized, an amount of the authorized transfer, and the player's account balance.

The player input device 110 may comprise, for example, a keypad, control buttons, touch display, a joy stick, a touch screen, or a combination thereof. The player input device 110 allows the player to place their pari-mutuel wager on an event, such as a dog or horse race, by enabling the player to select the outcome of the particular event being wagered on.

Figure 1B:
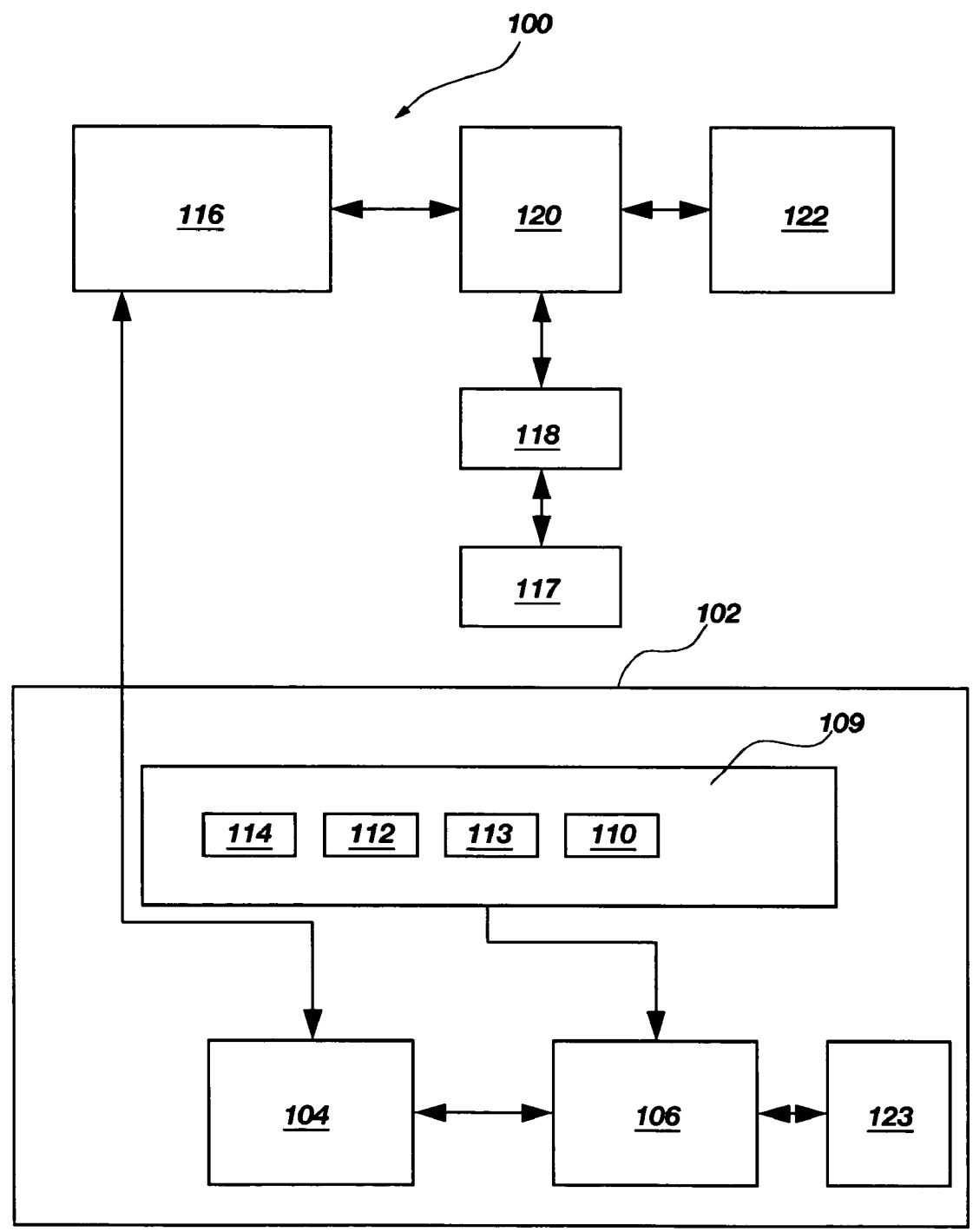
Figure 1C:
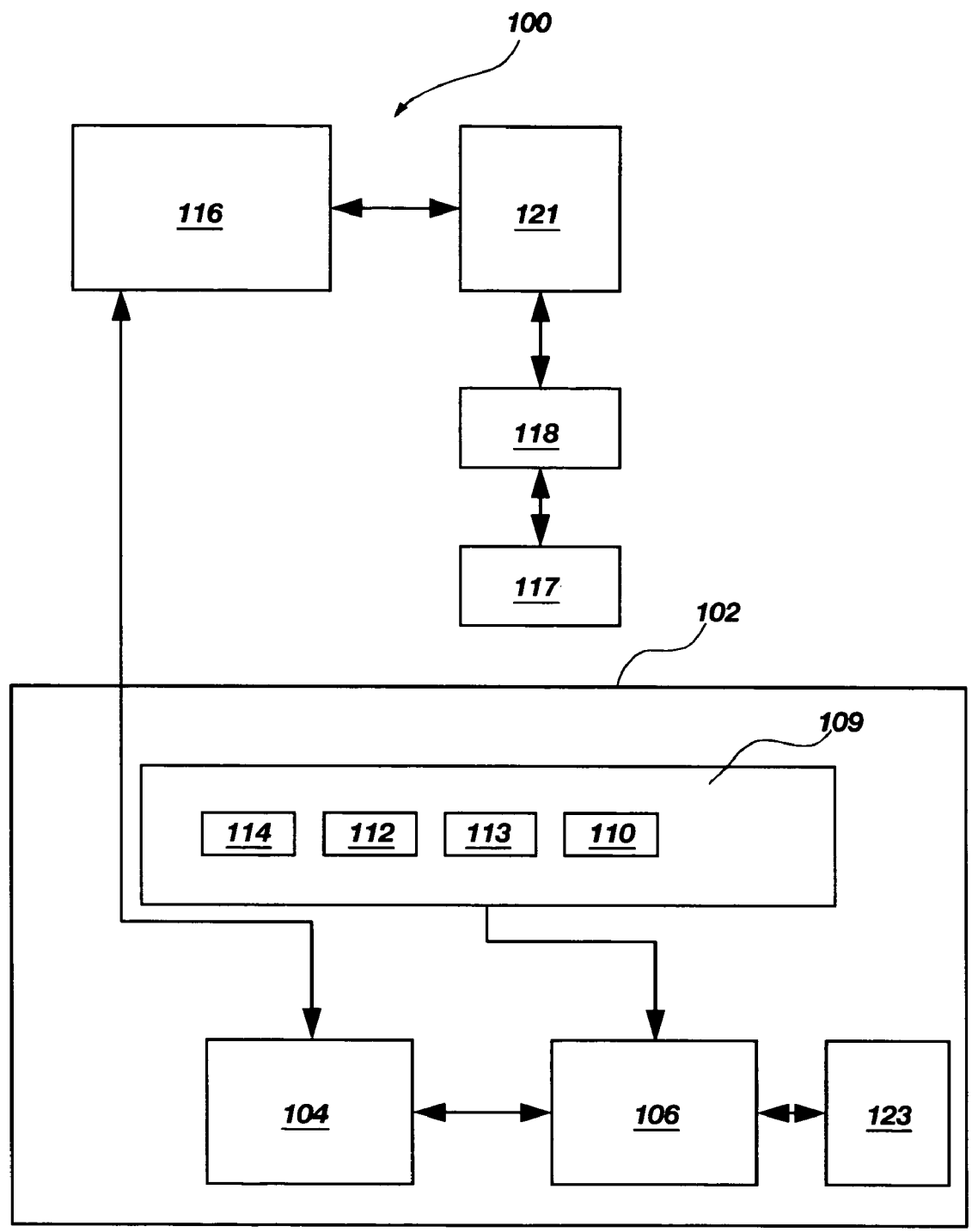

The pari-mutuel gaming terminal 102 may be configured with network interface apparatus 104 including components such as ports, cable connections, and/or network cards for linking the pari-mutuel gaming terminal 102 to the pari-mutuel establishment computer system 116 via an intranet and/or other network (e.g., a local area network (LAN), a wide area network (WAN), the Internet (also referred to as the World Wide Web), etc.). Encrypted communications may be employed for additional security if necessary or desirable. Although only a single pari-mutuel gaming terminal 102 is shown in FIG. 1, a plurality of pari-mutuel gaming terminals 102 may be connected to the pari-mutuel gaming establishment computer system 116 (e.g., a central server) using such a network. As shown in FIG. 1B, a pari-mutuel establishment computer system 116 may also be operably coupled to an electronic funds transfer (EFT) system 120 through a connection such as, for example, by a phone or cable line, in order to utilize payment with a credit instrument such as a credit/debit card. The EFT system 120 is, in turn, operably coupled to credit/debit card issuing system 122 using a cable or phone line. As shown in FIG. 1C, in another system for implementing the methods of the present invention utilizing a credit instrument, the pari-mutuel gaming establishment computer system 116 will not have the player's account information and balance stored on it. Instead, the pari-mutuel gaming establishment computer system 116 may be operably coupled to a financial server 121 located off-site from the pari-mutuel gaming establishment that has the player's account balance and associated account information stored on it. It is also understood that the present invention embraces employing a commercially available customer relationship management (CRM) system, such as PEOPLE SOFT™, to manage and store the player's account information and account balance. The CRM system may be used in conjunction with pari-mutuel gaming establishment computer system 116 or in conjunction with an off-site computer server in communication with the pari-mutuel gaming establishment computer system 116 and computer server 118.

A device for reading the credit instrument 117, optionally having a secondary identifier input device 113 associated therewith (not shown), may be located at concessionaires, admission entrances, special access areas, and may be in communication with either the pari-mutuel gaming establishment computer system 116, the EFT system 120, or the financial server 121 via a computer server 118 as respectively illustrated in FIGS. 1A-1C.

Figure 2A:
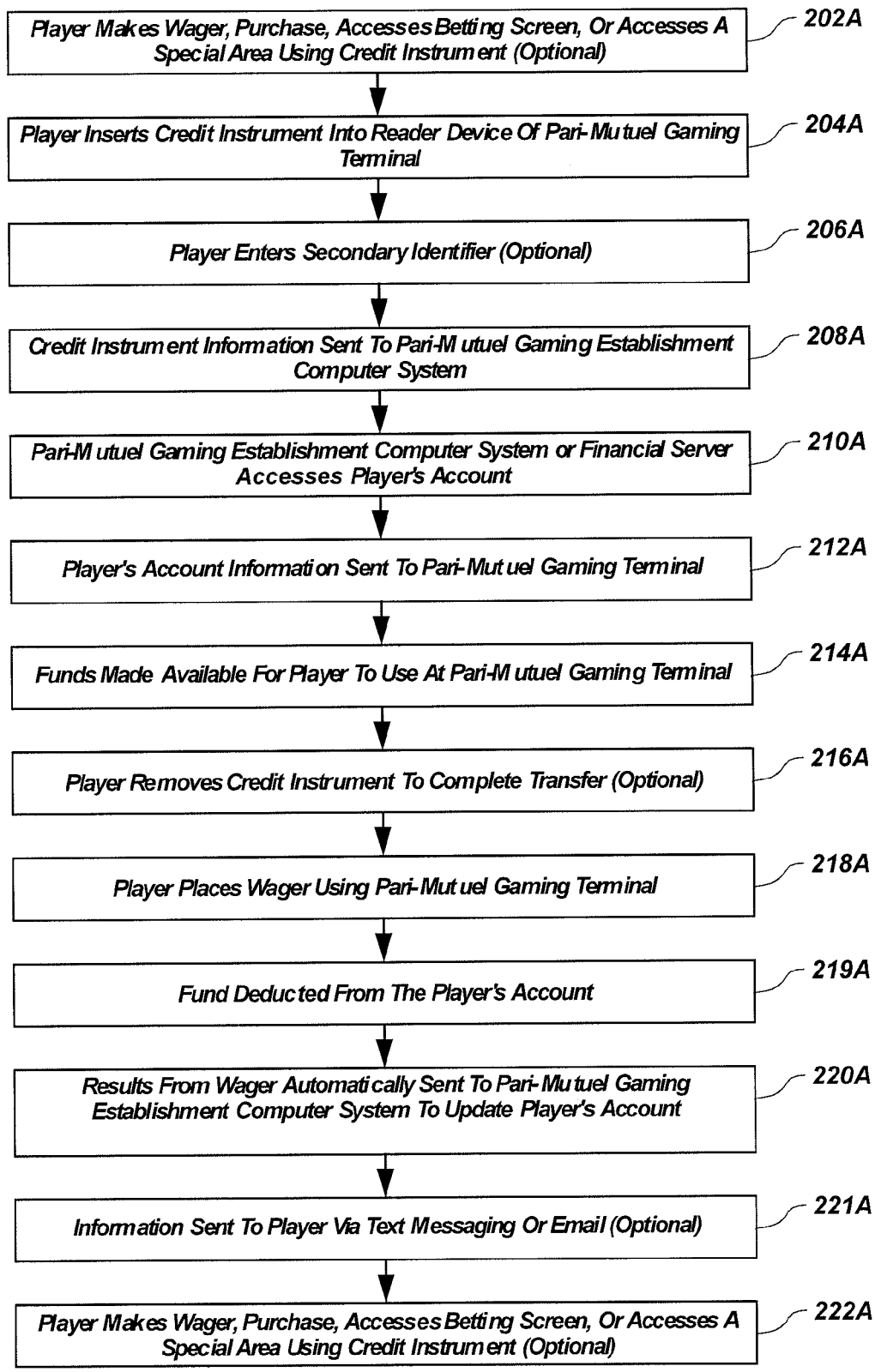
FIG. 2A is a process flow diagram of an exemplary method of the present invention that utilizes a credit instrument for pari-mutuel wagering and for purchase of goods and/or services at the pari-mutuel gaming establishment.

FIG. 2A comprises a process flow diagram wherein an exemplary method of the present invention is illustrated, which method uses a credit instrument as a cash substitute for pari-mutuel wagering and purchases of goods and/or services at a pari-mutuel gaming establishment. In another exemplary embodiment, the method comprises using the credit instrument to enable the player to participate in the pari-mutuel gaming activity. The method will be described in conjunction with FIGS. 1A and 1C. Prior to act 202A, a player may have already used his or her house card or anonymous token card for placing a wager, for the purchase of products and/or services, for accessing additional betting screens, and/or for gaining entry into a secure area such as the club house at the pari-mutuel gaming establishment. The purchase of a product or placement of a wager may be effectuated with different identifiers associated with the credit instrument. For instance, the credit instrument may be associated with more than one identifier such as, for example, a card number, a magnetic stripe, or a bar code. Examples of products or services available for purchase at the pari-mutuel gaming establishment may include food, drink, parking, admission, among many others. Next, in act 204A a pari-mutuel gaming terminal 102, located at a staffed or self-serve terminal at the pari-mutuel gaming establishment, detects that a player has inserted a credit instrument into the device for reading the credit instrument 114 of a pari-mutuel gaming terminal 102. If the pari-mutuel gaming terminal 102 does not have a device for reading the credit instrument 114, the player's account information may be manually entered into the player interface 109 using a keypad or other suitable player interface device. Optionally, for security purposes, act 206A may be required where the player enters into the player interface 109 through a secondary identifier input device 113 a secondary identifier such as a personal identification number (PIN) entered on a key pad, or uses a smart card with an embedded microchip, an electronic button for entry of a code such as a PIN at the player interface 109, a finger print imaging device, a retinal scan, or another type of biometrics device for added security measures to help verify a player's identity for the account to be accessed. The player may also be allowed to change their PIN using the player interface 109. If the player changes his or her PIN, the pari-mutuel gaming terminal 102 may be programmed to require the player to enter the new PIN each time the credit instrument is used. The software of the gaming terminal 102 or the device for reading the credit instrument 114 may be programmed to lock-out an account (i.e., prevent access to the account) if the player enters the incorrect PIN a predetermined number of times.

Again referring to FIG. 2A, after act 204A or 206A, the player's account information associated with the credit instrument, such as a unique identification number, is sent to the pari-mutuel gaming establishment computer system 116 in act 208A. In act 210A, the pari-mutuel gaming establishment computer system 116 or the financial server 121 accesses the player's account information associated with the credit instrument. Act 210A may take place without the player inputting the desired amount of playing credit. Instead, the pari-mutuel gaming terminal 102 interface software may automatically generate a request for the amount of credit on the player's account. If the system of FIG. 1C is utilized, the player's account information and balance is not stored on the pari-mutuel gaming establishment computer system 116 and the pari-mutuel gaming establishment computer system 116 forwards a request to the financial server 121 to access the player's account information and balance. In act 212A, the player's account information associated with the credit instrument is automatically sent to the pari-mutuel gaming terminal 102 from the pari-mutuel gaming establishment's computer system 116 directly if the system of FIG. 1A is utilized or indirectly via the financial server 121 if the system of FIG. 1C is utilized. If the player's account balance contains a positive balance, funds are made available for the player to use at the pari-mutuel gaming terminal 102 in act 214A.

Optionally, in order to prevent the player from leaving their credit instrument in pari-mutuel gaming terminal 102, the pari-mutuel gaming terminal 102 software may be programmed so that the player is required to remove his or her credit instrument at act 216A before placing the wager. In act 218A, the player places a pari-mutuel wager on an event using a player input device 110 linked to the player interface 109 of the pari-mutuel gaming terminal 102. Following the placement of the pari-mutuel wager, in act 219A the funds may be automatically deducted from the player's account. Optionally, if the pari-mutuel gaming terminal 102 is equipped with a printer 123, the player may receive a printed receipt recording the wager placed.

After the conclusion of the wagering event, such as a dog or horse race, the results from the race or event are automatically sent to the pari-mutuel gaming establishment computer system 116 and, if necessary, forwarded to the financial server 121 via pari-mutuel gaming establishment computer system 116, which updates the player's account information in act 220A. In other words, after the event that the player wagered upon is over, the player's account balance is updated such that winnings are added to the account balance. Following the results of the pari-mutuel wager, in act 221A, which may occur after or simultaneously with act 220A, the results of the pari-mutuel wager, the player's account balance, or both may be sent to the player via text messaging to the player's pager, cellular phone, or emailed to the player's email address. Also, after placing his or her wager, in act 222A, the player may optionally continue to place wagers on different additional events, make purchases of products and/or services, or use the credit instrument for additional purposes (e.g., club house access, etc.) at the pari-mutuel gaming establishment using their credit instrument at a device for reading the credit instrument 117. Any balance remaining in the account associated with the credit instrument may also be cashed out at a staffed terminal, a voucher may be issued at a self-serve terminal at the pari-mutuel gaming establishment that is equipped with a device for reading the credit instrument 117, or the credit instrument may be mailed to the pari-mutuel gaming establishment for redemption. The remaining balance may, also, be transferred by direct deposit to the player's bank account. Any remaining balance may also be left in the account associated with the credit instrument such that the player may re-use the credit instrument at a subsequent time. The purchase of goods and/or services and the use of the credit instrument for additional purposes at the pari-mutuel gaming establishment may be effected by the concessionaires of the goods and services using a device for reading the credit instruments 117 that enable purchases with the credit instrument. Again, after each subsequent wager or purchases of goods and/or services, the player's account information may be automatically updated on the pari-mutuel gaming establishment system 100. If the funds of the account associated with the credit instrument are depleted or if the player desires additional funds, the player may add funds to the account using cash, check, or credit/debit card at any staffed or self-serve terminal that accepts such payments. Staffed or self-serve terminals may be located at the pari-mutuel gaming establishment that has a device for reading the credit instrument 117 that enables adding funds to the account associated with the credit instrument with a player's credit/debit card, checks, cash, etc.

Figure 2B:
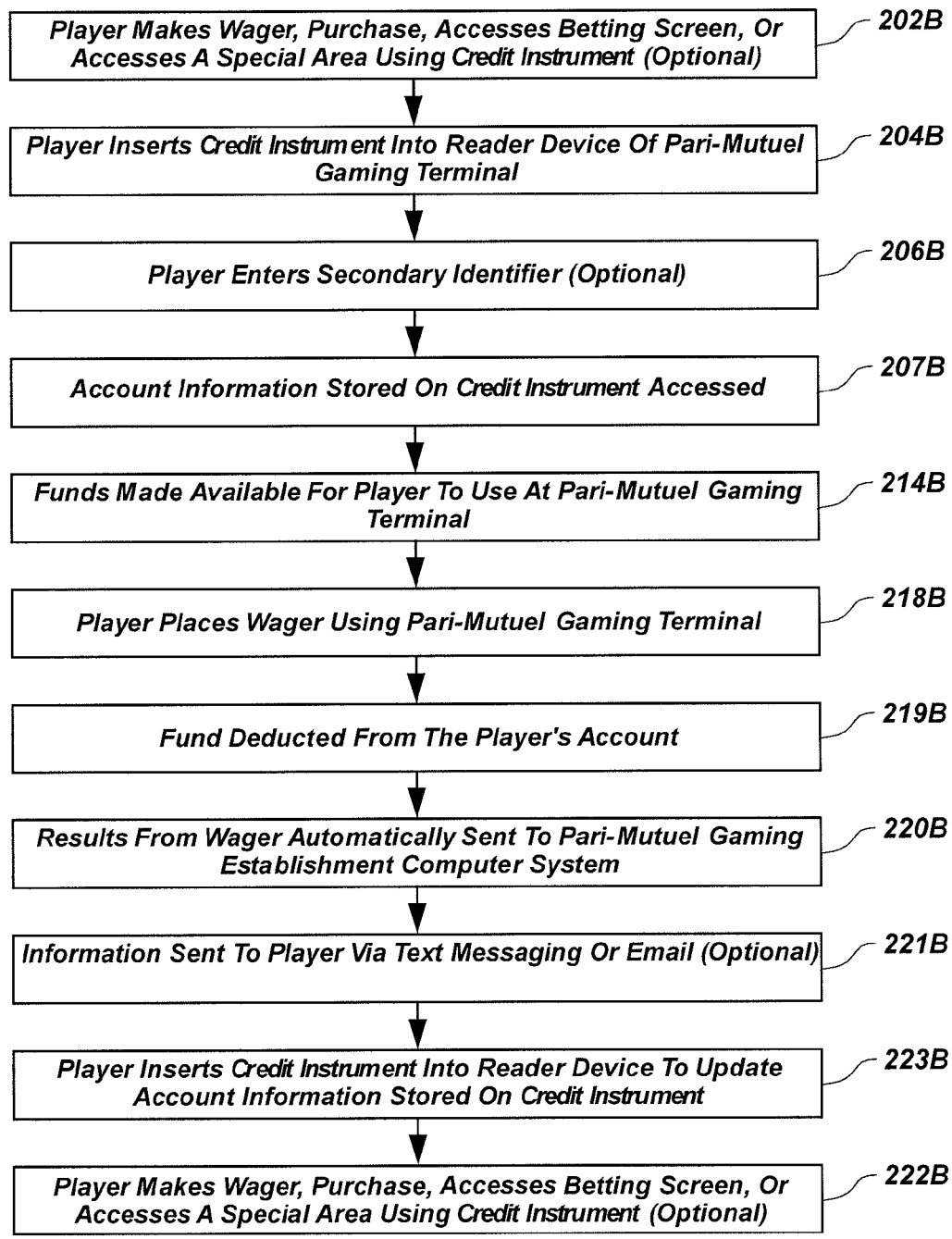
FIG. 2B is a process flow diagram of an exemplary method of the present invention that utilizes a credit instrument comprising a smart card for pari-mutuel wagering and for purchase of goods and/or services at the pari-mutuel gaming establishment.

Referring to FIG. 2B, a process flow diagram for an exemplary method of the present invention is illustrated, which method utilizes a house card comprising a credit instrument as a cash substitute for pari-mutuel wagering and purchases of goods and/or services at a pari-mutuel gaming establishment. The credit instrument is associated with a memory chip or similar device that stores the player's account information and balance. The method will be described in conjunction with FIG. 1A. Prior to act 202B, a player may have already used his or her credit instrument for placing a wager, for the purchase of products and/or services, for accessing additional betting screens, and/or for gaining entry into a secure area such as the club house at the pari-mutuel gaming establishment. Examples of products or services available for purchase at the pari-mutuel gaming establishment may include food, drink, parking, and admission, among many others. Next, in act 204B a pari-mutuel gaming terminal 102, located at a staffed or self-serve terminal at the pari-mutuel gaming establishment, detects that a player has inserted a credit instrument into the device for reading the credit instrument 114 of a pari-mutuel gaming terminal 102. Optionally, for security purposes, act 206B may be required where the player enters into the player interface 109 through a secondary identifier input device 113 a secondary identifier such as a personal identification number (PIN) or uses the credit instrument associated with a smart card with an embedded microchip, an electronic button for entry of a code such as a PIN at the player interface 109, a finger print imaging device, a retinal scan, or another type of biometrics device for added security measures to help verify a player's identity for the account to be accessed. The player may also be allowed to change their PIN using the player interface 109. If the player changes his or her PIN, the pari-mutuel gaming terminal 102 may be programmed to require the player to enter the new PIN each time the credit instrument is used. The software of the gaming terminal 102 or the device for reading the credit instrument 114 may be programmed to lock-out an account (i.e., prevent access to the account) if the player enters the incorrect PIN a predetermined number of times.

Again referring to FIG. 2B, after act 204B or 206B, the player's account information associated with the credit instrument is accessed by the pari-mutuel gaming terminal 102 in act 207B. If the player's account balance contains a positive balance, funds are made available for the player to use at the pari-mutuel gaming terminal 102 in act 214B. In act 218B, the player places a pari-mutuel wager on an event using a player input device 110 linked to the player interface 109 of the pari-mutuel gaming terminal 102. Following the placement of the pari-mutuel wager, in act 219B the funds may be automatically deducted from the player's account updating the account balance stored on the credit instrument. Optionally, if the pari-mutuel gaming terminal 102 is equipped with a printer 123, the player may receive a printed receipt recording the wager placed.

After the conclusion of the pari-mutuel wagering event, such as the dog or horse race, the results from the race or event are automatically sent to the pari-mutuel gaming establishment computer system 116 at act 220B. Following the results of the pari-mutuel wager, in act 221B, which may occur after or simultaneously with act 220B, the results of the pari-mutuel wager may be sent to the player via text messaging to the player's pager, cellular phone, or emailed to the player's email address. In act 223B, the player may update his or her account information associated with their credit instrument, anytime after the results of the race or event are official, by inserting the credit instrument into a device for reading the credit instrument 117 at the pari-mutuel gaming establishment which communicates with the pari-mutuel gaming establishment computer system 116. The pari-mutuel gaming establishment computer system 116 communicates the results of the race or event to the credit instrument to update the player's account information associated with the credit instrument. In other words, after the event that the player wagered upon is over, the player's account balance is updated such that winnings are added to the account balance associated with the credit instrument. Also, after placing his or her wager, in act 222B, the player may optionally continue to place wagers on different additional events, make purchases of products and/or services, or use the credit instrument for additional purposes (e.g., club house access, etc.) at the pari-mutuel gaming establishment using their credit instrument at a device for reading the credit instrument 117. Any balance remaining in the account associated with the credit instrument may also be cashed out at a staffed terminal, a voucher may be issued at a self-serve terminal at the pari-mutuel gaming establishment that is equipped with a device for reading the credit instrument 117, or the credit instrument may be mailed to the pari-mutuel gaming establishment for redemption. The remaining balance may, also, be transferred by direct deposit to the player's bank account. The purchase of goods and/or services and the use of the credit instrument for additional purposes at the pari-mutuel gaming establishment may be effected by the concessionaires of the goods and services using device for reading the credit instruments 117 that enable purchases with a credit instrument. Again, after each subsequent wager or purchases of goods and/or services, the player's account balance may be automatically updated and stored in the account associated with the credit instrument. If the funds of the account associated with the credit instrument are depleted or if the player desires additional funds, the player may add funds to the account using cash, check, or credit/debit card at any staffed or self-serve terminal that accepts such payments. Staffed or self-serve terminals may be located at the pari-mutuel gaming establishment that have a device for reading the credit instrument 117 that enables adding funds to the account associated with the credit instrument with a player's credit/debit card, checks, cash, etc.

Figure 3:
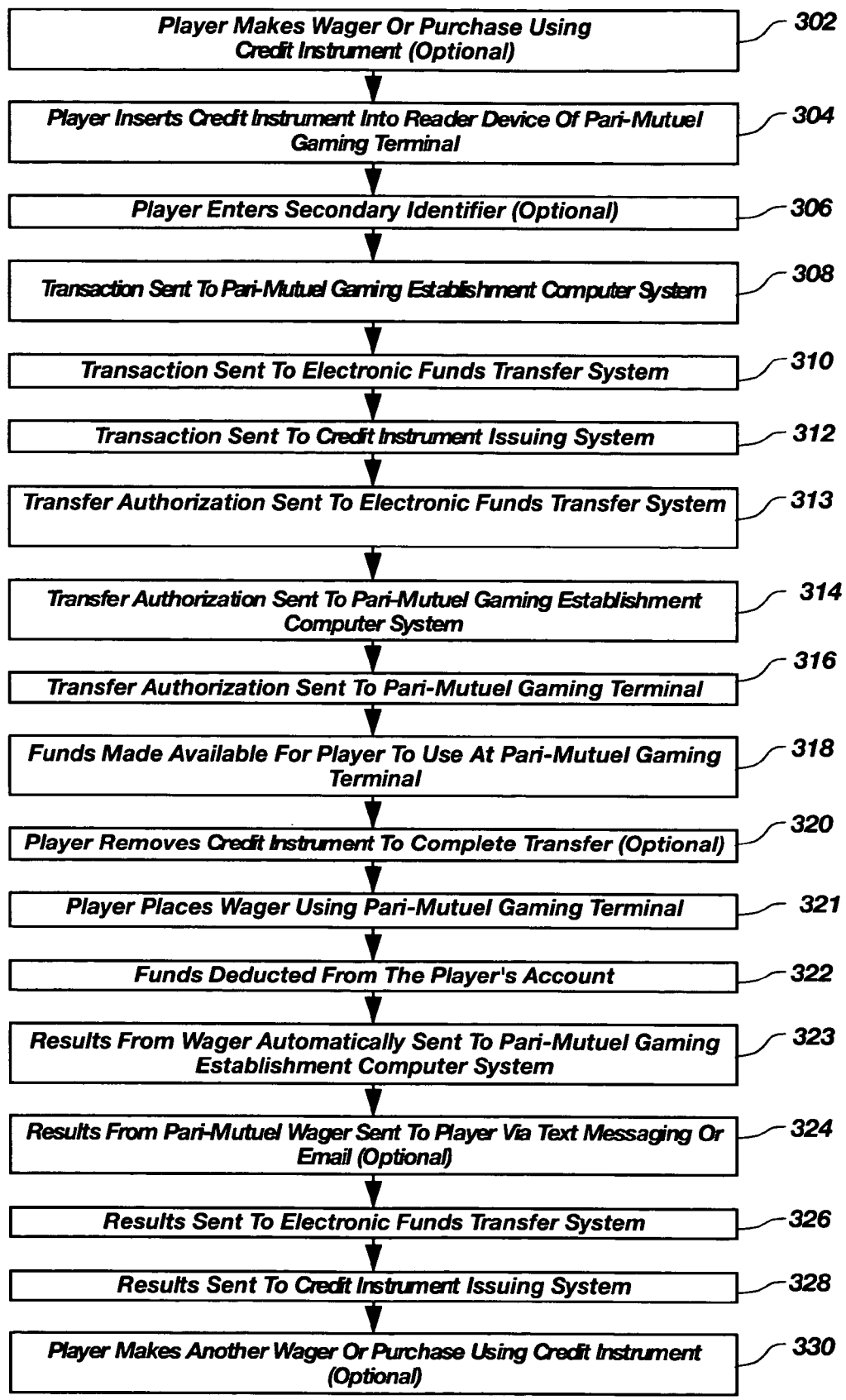
FIG. 3 is a process flow diagram of an exemplary method of the present invention that utilizes a credit instrument for pari-mutuel wagering and for purchase of goods and/or services at the pari-mutuel gaming establishment.

Referring to FIG. 3, a process flow diagram for an exemplary method of the pari-mutuel gaming methods of the present invention that utilizes an EFT system is illustrated. The method will be described in conjunction with FIG. 1B. Prior to act 302, a player may have already used their credit instrument for the purchase of products and/or services at the pari-mutuel gaming establishment or have already placed a wager using funds transferred via an EFT system. Next, in act 304, the pari-mutuel gaming terminal 102, located at a staffed or self-serve terminal at the pari-mutuel gaming establishment, detects that a player has inserted a credit/debit card into a device for reading the credit instrument 114 of a pari-mutuel gaming terminal 102. If the pari-mutuel gaming terminal 102 does not have a device for reading the credit instrument 114, the player's account information may be manually entered into the player interface 109 using a keypad or other suitable player interface device. As with the previous method described in FIGS. 2A and 2B, optionally, for security purposes, act 306 may be required where the player enters into a secondary identifier input device 113 of the player interface 109 a secondary identifier such as a personal identification number or uses a credit instrument associated with an embedded microchip, an electronic button for entry of a code such as a PIN at the player interface 109, a finger print imaging device, a retinal scan, or another type of biometrics device for added security to help verify a player's identity and account to be accessed. The software of the gaming terminal 102 or the device for reading the credit instrument 114 may be programmed to lock-out an account (i.e., prevent access to the account) if the player enters the incorrect PIN a predetermined number of times.

Again referring to FIG. 3, after act 304 or 306, a transaction request for a specific amount of wagering funds is sent to the pari-mutuel gaming establishment computer system 116 after the player inputs the desired amount into the player input device 110 of the player interface 109 in act 308. In act 310, the same transaction information is forwarded by the pari-mutuel gaming establishment computer system 116 to the EFT system 120 using a phone line, cable line, or other suitable communication mechanism. In act 312, the same transaction information is sent to the credit/debit card issuing system 122 by the EFT system 120. At this point in the process, the EFT system 120 treats the transaction request like any other transaction it might receive from a point of sale terminal or an ATM terminal.

In act 313, if the transaction is authorized by the credit/debit card issuing system 122, a transfer authorization is sent to the EFT system 120. In act 314, the transfer authorization for funds is forwarded by the EFT system 120 to the pari-mutuel gaming establishment computer system 116. In act 316, the transfer authorization is forwarded to the pari-mutuel gaming terminal 102 from the pari-mutuel gaming establishment computer system 116. Following the player's account information and authorization being sent to the pari-mutuel gaming establishment computer system 116, the player's desired amount of funds are made available for the player to use at pari-mutuel gaming terminal 102 in act 318.

Optionally, in order to prevent the player from leaving their credit instrument in the pari-mutuel gaming terminal 102, the pari-mutuel gaming terminal 102 software may be programmed so that the player must remove his or her credit instrument at act 320 in order to place his or her wager. The player then removes his or her credit instrument at act 320 and may begin playing the pari-mutuel gaming terminal 102. In act 321, the player places a pari-mutuel wager on an event using the pari-mutuel gaming terminal 102. Following the player placing the pari-mutuel wager, in act 322 the funds may be automatically deducted from the player's account.

After the conclusion of the pari-mutuel event, such as a dog or horse race, that was wagered upon by the player using his or her credit instrument, in act 323, the results from the wager may be automatically sent to the pari-mutuel gaming establishment computer system 116. Following the results of the pari-mutuel wager, in act 324, which may occur after or simultaneously with act 323, the results of the wager may be sent to the player via text messaging to a player's pager, cellular phone, or emailed to the player's email address. In act 326, if the player wins as a result of his or her wager, the pari-mutuel gaming establishment computer system 116 forwards a request to the EFT system 120 to credit the player's account associated with the credit instrument. Then, in act 328, the EFT system 120 sends the request to credit the player's account associated with the credit instrument to the credit/debit card issuing system 122, which updates the player's account information.

As with the previous embodiment described with respect to FIGS. 2A and 2B, after placing a wager, the player may optionally continue to place wagers on different events or make purchases of products and/or services at the pari-mutuel gaming establishment using the credit instrument at a device for reading the credit instrument 117, if so desired, at act 330. The purchase of goods and/or services at the pari-mutuel gaming establishment may be effected by the concessionaires of the goods and services using a device for reading the credit instruments 117 that enable purchases with a credit instrument. The player may also withdraw cash from an ATM on-site at the pari-mutuel betting establishment using the credit instrument. Again, after each subsequent wager is placed by the player, the player's account information is automatically updated on the pari-mutuel gaming establishment computer system 116 and credit is transferred to the player's account associated with the credit instrument via the EFT system 120.

Figure 4A:
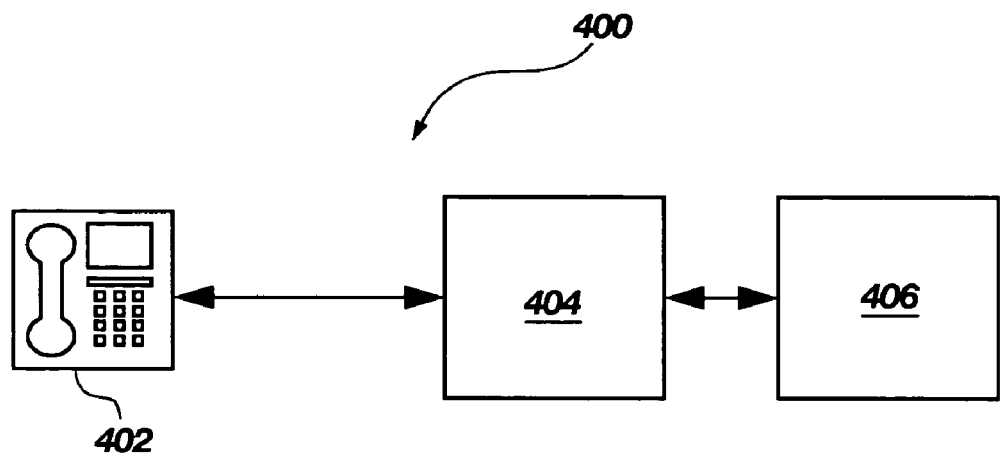
FIGS. 4A and 4B are block diagrams of pari-mutuel gaming systems in which the pari-mutuel gaming methods of the present invention described in FIG. 5 may be implemented.
Figure 4B:
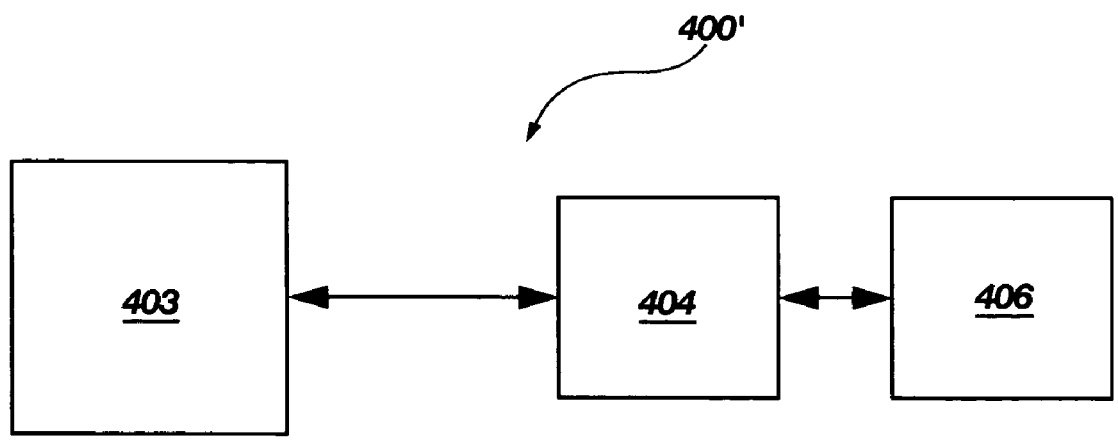

Referring to FIGS. 4A and 4B, pari-mutuel gaming systems 400 and 400' are illustrated using block diagrams, in which the pari-mutuel gaming methods of the present invention may be implemented. As shown in FIG. 4A, the pari-mutuel gaming system 400 utilizes a touchtone telephone 402 for a player to place a pari-mutuel wager from a location off-site to the pari-mutuel gaming establishment such as, for example, a player's home or hotel room, etc. Again referring to FIG. 4A, a touchtone telephone 402 may be in communication with a remote computer 404. The remote computer 404 may be located at a pari-mutuel gaming establishment or may be located off-site from a pari-mutuel gaming establishment such as at an office building. The remote computer 404 may be configured to calculate odds, pool bets from multiple bets, and store the player's account information and balance. If the remote computer 404 does not contain the player's account information and balance, the remote computer 404 may be in communication with a financial network 406 which may comprise a financial server 121 (FIG. 1C) or an EFT system 120 and credit/debit card issuing system 122 (FIG. 1B) via phone line, cable line, or other suitable connection to enable access to the player's account information and balance as effected in the previous embodiments. The communication may be effected between touchtone telephone 402 and remote computer 404 via a conventional phone line.

As shown in FIG. 4B, if a personal computer 403 is used, the communication with the remote computer 404 may be effected using a phone line, cable line, Internet, or other suitable technology. The personal computer 403 may be a conventional personal computer including the associated software to enable communication with remote computer 404. Such communication between the personal computer 403 and the remote computer 404 may occur over the Internet or with a direct connection. Again, the remote computer 404 may be located at a pari-mutuel gaming establishment or may be located off-site from a pari-mutuel gaming establishment such as at an office building. Furthermore, when either a touchtone telephone 402 or a personal computer 403 is used, the communication with the remote computer 404 may be encrypted for additional security if necessary or desired. It is also contemplated that wireless communications may be employed, using suitable encryption technology.

Figure 5:
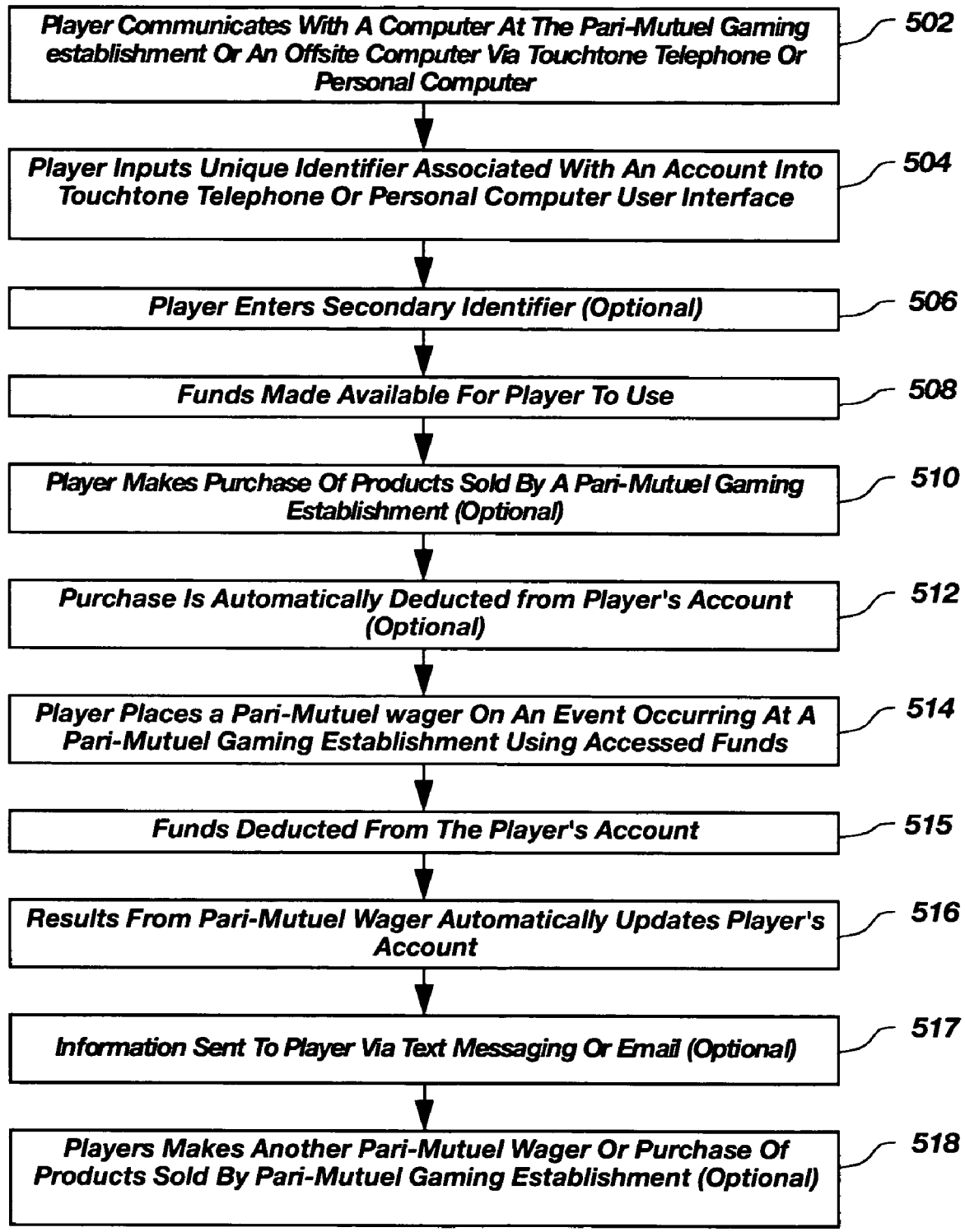
FIG. 5 is a process flow diagram of an exemplary method of the present invention that utilizes a credit instrument for remotely placing a pari-mutuel wager over a touchtone telephone or a personal computer.
Figure 6:
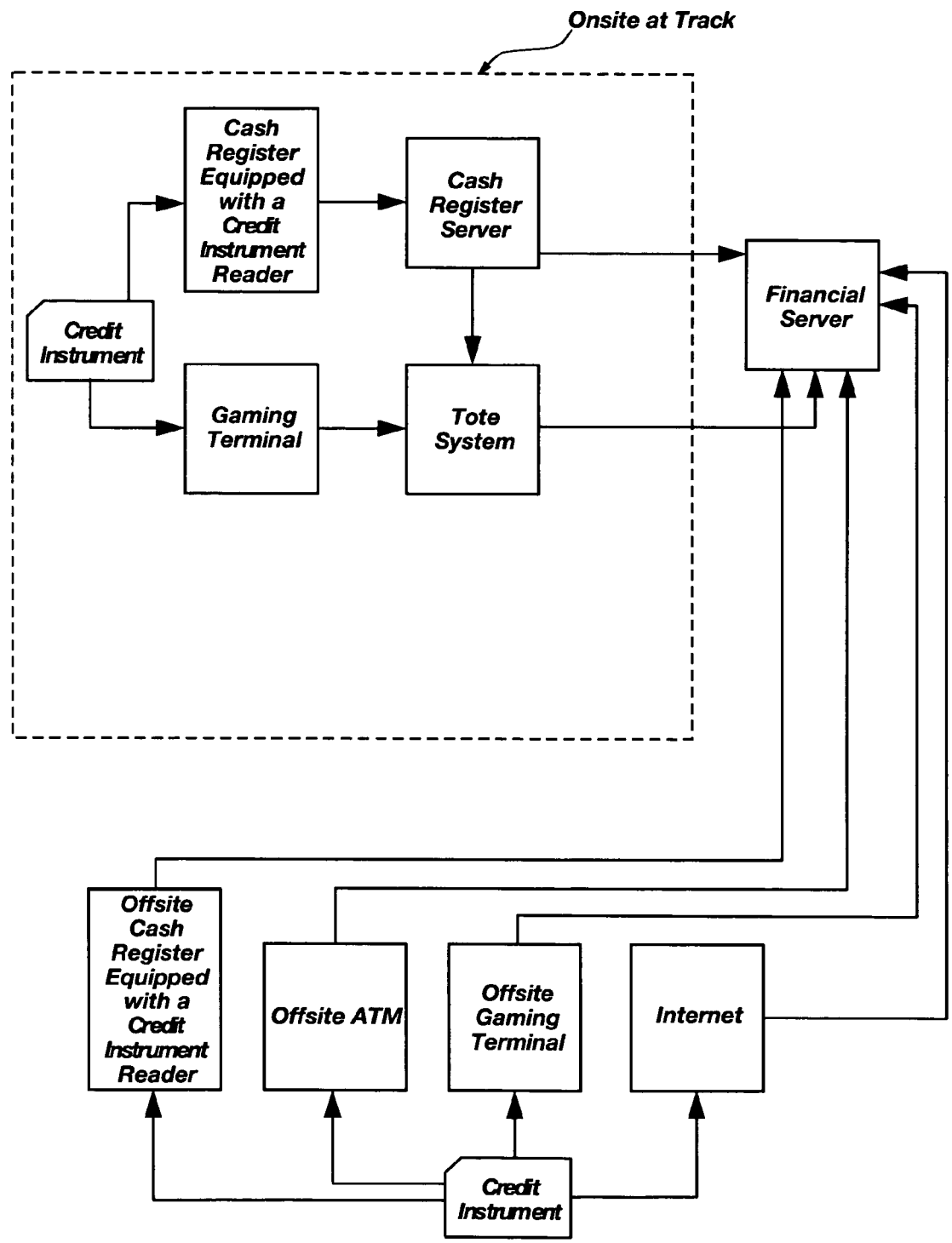
FIG. 6 is an example of the ability to use a credit instrument on-site or off-site from a pari-mutuel gaming establishment.

Referring to FIG. 5, a process flow diagram for an exemplary method of the present invention is illustrated, which method enables using a monetary account associated with a credit instrument for placing a pari-mutuel wager remotely over a touch tone telephone or a personal computer. If a house card is used as the credit instrument, the house card may be "upgraded" from the house card that may only be able to be used at the pari-mutuel gaming establishment to a house card that is capable of being used for placing wagers remotely by the player having the account information reconfigured by the pari-mutuel gaming establishment to enable such a use. In act 502, the player communicates with the remote computer 404 which is located at a pari-mutuel gaming establishment or at an off-site location. The communication may be initiated by the player dialing a phone number if a touchtone telephone 402 is used or by utilizing an Internet connection if a personal computer 403 is used.

In act 504, the player inputs a unique identifier associated with an account such as a number associated with a credit instrument. The player may input the unique identifier by selecting the appropriate numbers corresponding to the account number on the keypad of the touchtone telephone 402. If a personal computer 403 is used, the player may input the account information in a user interface on the personal computer 403. The user interface may be made available to the player by accessing a specific host website. Optionally, for security purposes, in act 506, the player may enter a secondary identifier (e.g., a PIN or password) using either the keypad of the touchtone telephone 402 or the user interface of the host website. The account may be locked-out (i.e., access to the account prevented) if the player enters the incorrect PIN or password a predetermined number of times. In act 508, funds from the player's account are made available for the player to use.

Following the funds being made available to the player, in act 510, the player may optionally purchase products sold by the pari-mutuel gaming establishment via the touchtone telephone 402 or the Internet. Examples of products that may be purchased are handicapping information, souvenirs, clothing that carries the logo of the particular pari-mutuel gaming establishment, etc. The purchase may automatically be deducted from the player's account in act 512 as performed in the previous embodiments of FIGS. 2A, 2B, and 3. In act 514, the player may then place a pari-mutuel wager on an event occurring at a particular pari-mutuel gaming establishment using the accessed funds from the player's account. This may be accomplished by the player inputting the required information via touchtone telephone 402 or inputting the required information over a user interface on the Internet if personal computer 403 is used. If a remote computer 404 is acting as a central server, the player may be required to select, using either the keypad of the touchtone telephone 402 or a user interface over the Internet, at which pari-mutuel gaming establishment he or she desires to place a wager. For instance, the player may have the option of wagering at a number of different pari-mutuel gaming establishments (i.e., different horse or dog race tracks). The remote computer 404 may automatically deduct the finds wagered from the player's account in act 515. Following the results of the pari-mutuel wager, in act 516 the remote computer 404 automatically updates the player's account balance. Acts 515 and 516 may also be performed as in the previous embodiments of FIGS. 2A, 2B and 3. In other words, after the event that the player wagered upon is over, the player's account balance is updated such that winnings are added to the account balance. Following the results of the pari-mutuel wager, in act 517, which may occur after or simultaneously with act 516, the results may be sent to the player via text messaging to a player's pager, cellular phone, or emailed to the player's email address. If the player used a credit instrument to make a purchase or place a wager, the account balance associated with the credit instrument may also be sent to the player via text messaging to a player's pager, cellular phone, or emailed to the player's email address. Also, after placing his or her wager, the player may optionally continue to place wagers on different events or make purchases of products sold by the pari-mutuel gaming establishment in act 518. If the funds of the account associated with the credit instrument are depleted or if the player desires additional funds, the player may add funds to the account using a credit/debit card. The player may input his or her credit/debit card number to replenish the account associated with the credit instrument or to add additional funds to it using the touchtone telephone 402 or a user interface at the host website.

Although the foregoing description of the embodiments contains many specifics, these should not be construed as limiting the scope of the present invention, but merely as providing illustrations of some exemplary embodiments. Similarly, other embodiments of the invention may be devised which do not depart from the spirit or scope of the present invention. Further, features or elements of different embodiments may be employed in combination. The scope of the invention is, therefore, indicated and limited only by the appended claims and their legal equivalents, rather than by the foregoing description. All additions, deletions, and modifications to the present invention, as disclosed herein, which fall within the meaning and scope of the claims, are embraced thereby.

What is claimed is:

1. A method of pari-mutuel wagering using a gaming terminal, the method comprising:
   providing a gaming terminal configured for a player to place a pari-mutuel wager on a pari-mutuel event independent of the gaming terminal;
   providing a player an opportunity to place funds in an anonymous account;
   enabling the player to access at least a portion of the funds in the anonymous account for use at the gaming terminal;
   enabling the player to place a pari-mutuel wager at the gaming terminal on the pari-mutuel event using the at least a portion of the funds in the anonymous account;
   providing the player with an opportunity to associate the anonymous account with a credit instrument issued by an entity independent of a pari-mutuel gaming establishment providing the gaming terminal; and
   enabling the player to purchase goods or services at the pari-mutuel gaming establishment with the credit instrument using a portion of the funds in the anonymous account.

2. The method according to claim 1, further comprising using the credit instrument to access an informational display at a pari-mutuel gaming establishment providing the gaming terminal.

3. The method according to claim 1, further comprising providing the player with an opportunity to add additional funds to the anonymous account.

4. The method according to claim 1, wherein the player accessing the at least a portion of the funds comprises sending a request for allocation of the at least a portion of the funds to a remote computer in communication with the gaming terminal.

5. The method according to claim 4, wherein the player accessing the at least a portion of the funds further comprises receiving the at least a portion of the funds requested from an authorization sent to the gaming terminal from the remote computer.

6. The method according to claim 1, further comprising updating the anonymous account with winnings from a result of the pari-mutuel wager.

7. The method according to claim 1, wherein the credit instrument is selected from the group consisting of a credit card, a smart card, a debit card, a bank card, a voucher, an ATM card, a smart card account, a token/debit card, a stored value card, a pre-owned instrument, a gift card, a cell phone, a personal digital assistant, and combinations of any thereof.

8. The method according to claim 1, further comprising selecting the credit instrument to have a pre-denominated amount of funds.

9. The method according to claim 1, further comprising:
   wherein the player accessing the at least a portion of the funds comprises placing the credit instrument in the gaming terminal; and
   further comprising requiring that the player remove the credit instrument from the gaming terminal prior to placing the pari-mutuel wager.

10. The method according to claim 1, wherein the player accessing the at least a portion of the funds for use at the gaming terminal further comprises requesting a specific amount of funds as determined by the player.

11. The method according to claim 1, further comprising:
   selecting the credit instrument to be associated with a second monetary account comprising a debit card account or a credit card account administered by an entity other than an establishment providing the gaming terminal;
   transferring funds from the second monetary account to the anonymous account using the credit instrument; and
   accessing the at least a portion of the funds from the monetary account to place the pari-mutuel wager using the credit instrument.

12. The method according to claim 1, further comprising selecting the pari-mutuel event to be a horse race or a dog race.

13. A method of conducting a pari-mutuel gaming activity using a gaming terminal, the method comprising:
   providing a gaming terminal associated with a device for reading a credit instrument issued by an entity independent of the pari-mutuel gaming establishment;
   providing a player an opportunity to associate an anonymous account having a monetary value with a credit instrument read by the device;
   providing the player a second opportunity to place a pari-mutuel wager on a pari-mutuel gaming activity independent of the gaming terminal using the credit instrument and the gaming terminal;
   enabling the player to purchase goods or services at the pari-mutuel gaming establishment where the gaming terminal is located, directly using the monetary value of the anonymous account; and
   responsive to the player making a purchase with the credit instrument, adding funds to the anonymous account.

14. The method according to claim 13, further comprising providing the player a third opportunity to access at least a portion of the monetary value of the anonymous account using the credit instrument as read by the device.

15. The method according to claim 13, further comprising updating the monetary value with winnings from a result of the pari-mutuel wager.

16. The method according to claim 13, further comprising:
   providing the player a third opportunity to place the credit instrument in the device for reading the credit instrument of the gaming terminal to access the monetary value; and
   requiring the player to remove the credit instrument from the device for reading the credit instrument prior to placing the pari-mutuel wager.

17. The method according to claim 13, further comprising:
   selecting the credit instrument to be associated with the monetary value and with a second monetary account comprising a debit card account or a credit card account administered by the entity independent of the pari-mutuel gaming establishment; and
   enabling the player to transfer a portion of funds from the second monetary account to the monetary value using the credit instrument.

18. A system for conducting a pari-mutuel gaming activity, comprising:
- a gaming terminal associated with a device for reading at least one credit instrument issued by an entity not associated with an entity providing the gaming terminal;
- at least one credit instrument issued by an entity not associated with the entity providing the gaming terminal and associated with a monetary value;
- a network interface apparatus with associated software, wherein the software is operatively configured to enable the gaming terminal to:
  - enable a player to set up an anonymous account associated with a monetary value using at least a portion of the monetary value associated with the credit instrument;
  - enable the player to place a pari-mutuel wager on a pari-mutuel gaming activity independent of the gaming terminal on the gaming terminal using the at least one credit instrument as read by the device to access the anonymous account; and
  - enable the player to purchase goods or services offered by the entity providing the gaming terminal directly using the at least one credit instrument to access a portion of the monetary value of the anonymous account.

19. The system of claim 18, wherein the pari-mutuel gaming activity is a horse race or a dog race.

20. A system for conducting a pari-mutuel gaming activity, comprising:
- at least one gaming terminal having a credit instrument reader associated therewith;
- at least one credit instrument configured for association with both of an account of a financial institution and an account of a pari-mutuel gaming system, wherein the at least one credit instrument is readable by the credit instrument reader;
- a network interface apparatus with associated software, wherein the software is operatively configured to enable the at least one gaming terminal to:
  - enable a player to transfer funds between the account of the financial institution and the account of the pari-mutuel gaming system;
  - enable the player to place a pari-mutuel wager on a pari-mutuel gaming activity on the at least one gaming terminal with funds from the account of the pari-mutuel gaming system using the at least one credit instrument to access the account of the pari-mutuel gaming system; and
  - add funds to the account of the pari-mutuel gaming system in response to the player making a purchase with funds of the account of the financial institution.

21. The system of claim 20, wherein the at least one credit instrument is selected from the group consisting of a house card, a credit card, a smart card, a debit card, a bank card, a token card of a tote system, an anonymous token card, a pari-mutuel gaming venue issued card, a voucher, an ATM card, a smart card account, a combination house card/credit/debit card, a token/debit card, a stored value card, a pre-owned instrument, a gift card, a cell phone, a personal digital assistant, and combinations of any thereof.

22. The system of claim 20, wherein the software is further configured to associate the at least one credit instrument with a marketing program of the financial institution such that funds may be credited to the account of the pari-mutuel gaming system.

23. The system of claim 20, wherein the software is further configured to enable the player to purchase goods or services with the at least one credit instrument using funds from the account of the pari-mutuel gaming system.

* * * * *